(12) United States Patent
Kurata et al.

(10) Patent No.: US 11,917,934 B2
(45) Date of Patent: Mar. 5, 2024

(54) AGRICULTURAL MACHINE, AND SYSTEM AND METHOD FOR CONTROLLING AGRICULTURAL MACHINE

(71) Applicant: KUBOTA CORPORATION, Osaka (JP)

(72) Inventors: Ryo Kurata, Sakai (JP); Junichi Yuasa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 12 days.

(21) Appl. No.: 17/558,028

(22) Filed: Dec. 21, 2021

(65) Prior Publication Data

US 2022/0192075 A1  Jun. 23, 2022

(30) Foreign Application Priority Data

Dec. 22, 2020 (JP) ................. 2020-212843

(51) Int. Cl.
*A01B 69/00* (2006.01)
*A01B 69/04* (2006.01)
(Continued)

(52) U.S. Cl.
CPC .......... *A01B 69/008* (2013.01); *A01B 69/006* (2013.01); *B60W 50/0205* (2013.01);
(Continued)

(58) Field of Classification Search
CPC .................................................. A01B 69/008
See application file for complete search history.

(56) References Cited

U.S. PATENT DOCUMENTS 4,884,593 A * 12/1989 Chen ................... B60C 23/0496
137/227
7,295,103 B2   11/2007 Muller et al.
(Continued)

FOREIGN PATENT DOCUMENTS

CN    102514454 A  *  6/2012
CN    202413303 U  *  9/2012
(Continued)

OTHER PUBLICATIONS

Official Communication issued in corresponding European Patent Application No. 21216360.4, dated Apr. 25, 2022.

*Primary Examiner* — Shelley Chen
(74) *Attorney, Agent, or Firm* — Keating & Bennett, LLP

(57) ABSTRACT

An agricultural machine includes one or more tires, a detector to detect a low pressure state in which a pressure of one of the tires is lower than a reference range or a high pressure state in which the tire pressure is higher than the reference range, and a controller to control an operation of at least one of the agricultural machine and an additional agricultural machine to be linked to the agricultural machine. One of the agricultural machine and the additional agricultural machine is a work vehicle that is capable of self-driving, and the other one is an implement to be linked to the work vehicle. The controller causes, in response to detection of the low or high pressure state, at least one of the agricultural machines to perform a specific operation that is different from an operation to be performed when the pressure is in the reference range.

18 Claims, 22 Drawing Sheets

(51) Int. Cl.
*A01B 69/08* (2006.01)
*B60W 50/02* (2012.01)
*B60W 50/029* (2012.01)
*B60W 50/14* (2020.01)

(52) U.S. Cl.
CPC .......... *B60W 50/029* (2013.01); *B60W 50/14* (2013.01); *B60W 2422/70* (2013.01); *B60W 2530/20* (2013.01); *B60W 2756/10* (2020.02); *G05D 2201/0201* (2013.01)

(56) References Cited

U.S. PATENT DOCUMENTS

| | | | |
|---|---|---|---|
| 9,539,866 B2 * | 1/2017 | Mouchet | G07C 5/008 |
| 9,757,996 B2 * | 9/2017 | Uh | B60C 23/009 |
| 10,356,972 B2 * | 7/2019 | Andrews | A01B 63/111 |
| 2007/0068238 A1 | 3/2007 | Wendte | |
| 2007/0069877 A1 * | 3/2007 | Fogelstrom | B60C 23/005 |
| | | | 340/442 |
| 2010/0131147 A1 * | 5/2010 | Donnelli | G07C 5/008 |
| | | | 701/31.4 |
| 2013/0074591 A1 * | 3/2013 | Hyun | B60C 23/0416 |
| | | | 73/146.3 |
| 2015/0004573 A1 * | 1/2015 | Bomer | G09B 19/167 |
| | | | 434/219 |
| 2017/0113497 A1 * | 4/2017 | Schott | B60C 23/002 |
| 2019/0037761 A1 * | 2/2019 | Andrews | A01B 63/111 |
| 2019/0133023 A1 | 5/2019 | Iwami et al. | |
| 2019/0246548 A1 * | 8/2019 | Kovach | A01B 3/24 |
| 2020/0215859 A1 | 7/2020 | Horikoshi | |
| 2020/0254829 A1 * | 8/2020 | Schott | B60C 23/0479 |
| 2021/0146995 A1 | 5/2021 | Miyashita et al. | |

FOREIGN PATENT DOCUMENTS

| | | | | |
|---|---|---|---|---|
| CN | 102514454 B | * | 9/2014 | |
| CN | 104118284 B | * | 8/2016 | ............ B60C 23/00 |
| CN | 107499070 A | * | 12/2017 | |
| CN | 209400158 U | * | 9/2019 | |
| DE | 10 2013 106 548 A1 | | 12/2014 | |
| EP | 2 583 543 A1 | | 4/2013 | |
| EP | 2 583 842 A1 | | 4/2013 | |
| JP | 07-052622 A | | 2/1995 | |
| JP | 2003-146037 A | | 5/2003 | |
| JP | 2010-227071 A | | 10/2010 | |
| JP | 2012163447 A | * | 8/2012 | |
| JP | 5400818 B2 | * | 1/2014 | |
| JP | 2014-076748 A | | 5/2014 | |
| JP | 2019-006266 A | | 1/2019 | |
| JP | 2019-167116 A | | 10/2019 | |
| JP | 2020-005595 A | | 1/2020 | |
| JP | 2020-012680 A | | 1/2020 | |
| JP | 2020-104617 A | | 7/2020 | |
| WO | 2017/208306 A1 | | 12/2017 | |
| WO | 2020/012987 A1 | | 1/2020 | |

* cited by examiner

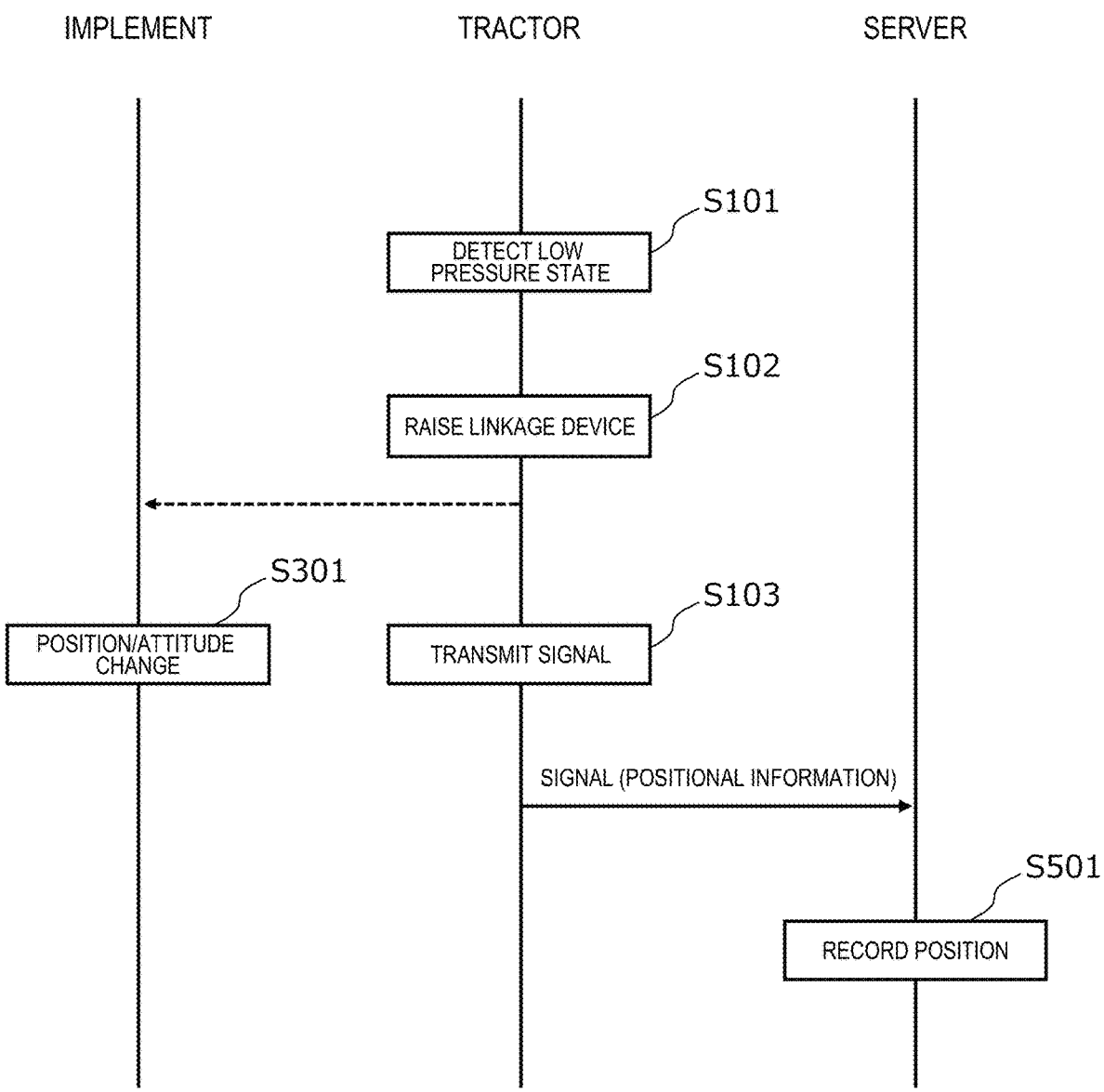

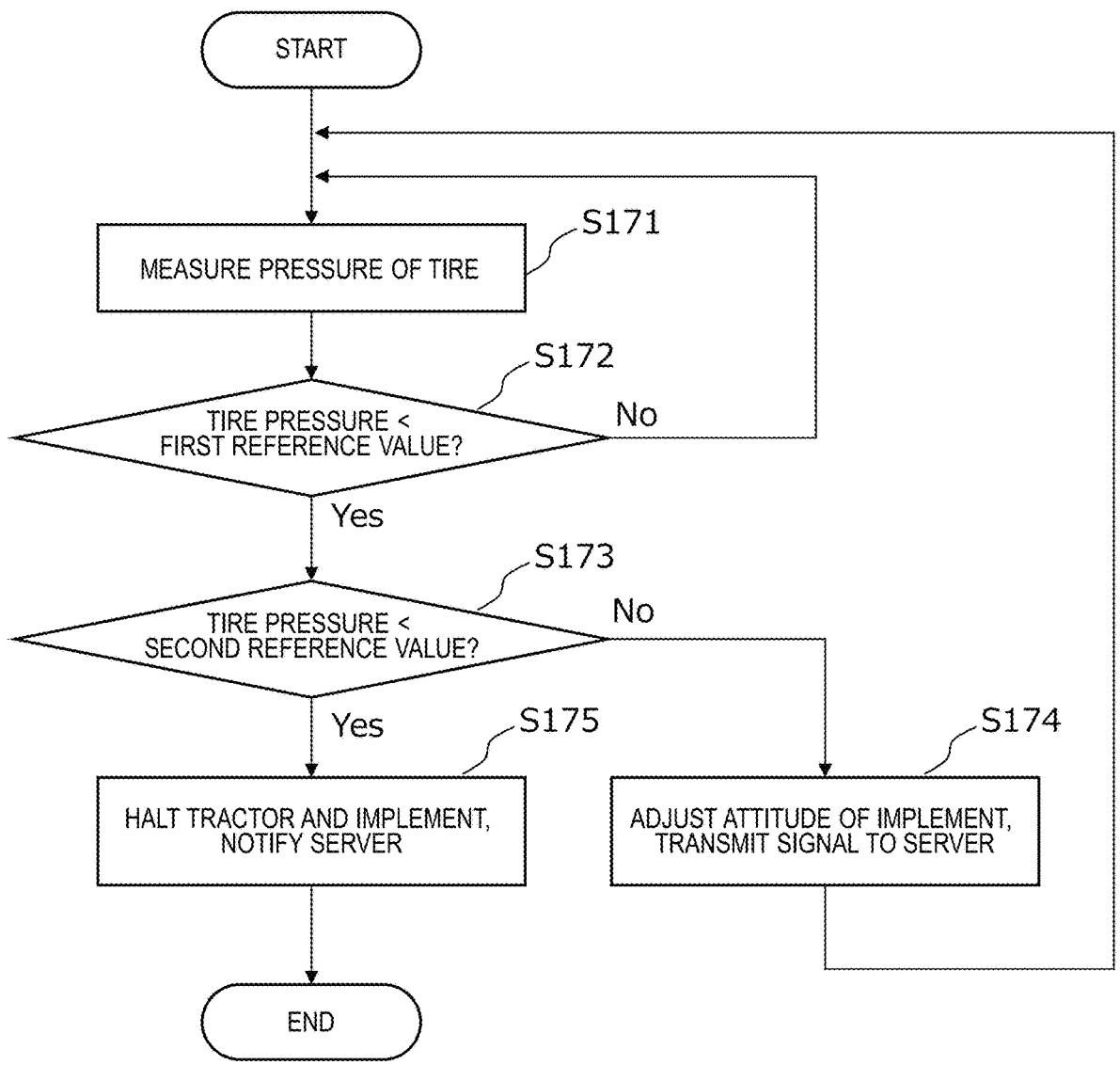

AGRICULTURAL MACHINE, AND SYSTEM AND METHOD FOR CONTROLLING AGRICULTURAL MACHINE

CROSS-REFERENCE TO RELATED APPLICATION

This application claims priority to Japanese Patent Application No. 2020-212843, filed on Dec. 22, 2020, the entire contents of which are hereby incorporated by reference.

BACKGROUND OF THE INVENTION

1. Field of the Invention

The present disclosure relates to an agricultural machine, and a system and method for controlling an agricultural machine.

2. Description of the Related Art

As attempts in next-generation agriculture, research and development of smart agriculture utilizing Information and Communication Technology (ICT) and Internet of Things (IoT) is underway. Research and development is also directed to the automation and unmanned use of tractors or other work vehicles to be used in the field. For example, work vehicles which travel via automatic steering by utilizing a positioning system that is capable of precise positioning, e.g., a GNSS (Global Navigation Satellite System), are coming into practical use. International Publication No. 2017/208306, Japanese Laid-Open Patent Publication No. 2020-104617 and Japanese Laid-Open Patent Publication No. 2020-12680 disclose examples of work vehicles that perform automatic steering based on positioning results obtained by using a GNSS.

On the other hand, Japanese Laid-Open Patent Publication No. 2019-6266 discloses an example of a method of monitoring the air pressure of a tire that is mounted on a vehicle. According to the method disclosed in Japanese Laid-Open Patent Publication No. 2019-6266, punctures due to air leakage can be detected, as distinguished from natural decreases in air pressure caused by changes in outside air temperature or the like.

SUMMARY OF THE INVENTION

Many agricultural machines, such as work vehicles (e.g., tractors) and implements to be linked to a work vehicle in use, include wheels with tires for traveling. If a tire abnormality occurs during travel, e.g., a puncture or other states of abnormal pressure, it may become difficult to continue any task that is being performed. When the work vehicle is traveling via human driving, the driver will be able to immediately know an abnormal pressure, e.g., puncture, and take appropriate measures such as stopping the task. However, when the work vehicle is automatically traveling, it is difficult to detect an abnormal pressure of a tire during travel and take appropriate measures.

An agricultural machine according to an illustrative preferred embodiment of the present disclosure includes one or more tires, a detector to detect a low pressure state in which a tire pressure of the one or more tires is lower than a reference range or a high pressure state in which the tire pressure is higher than the reference range, and a controller configured or programmed to control an operation of at least one of the agricultural machine and an additional agricultural machine to be linked to the agricultural machine. One of the agricultural machine and the additional agricultural machine is a work vehicle that is capable of self-driving. The other of the agricultural machine and the additional agricultural machine is an implement to be linked to the work vehicle in use. The controller is configured or programmed to cause, in response to detection of the low pressure state or the high pressure state, at least one of the agricultural machine and the additional agricultural machine to perform a specific operation that is different from an operation to be performed when the tire pressure is in the reference range.

General or specific aspects of various example preferred embodiments of the present disclosure may be implemented using a device, a system, a method, an integrated circuit, a computer program, a computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to a preferred embodiment of the present disclosure, it is possible to timely detect a low pressure state or a high pressure state of a tire of the work vehicle or the implement, and cause the work vehicle or the implement to perform a necessary operation. As a result, when an abnormally low pressure such as a puncture or an abnormally high pressure has occurred, for example, it is possible to cause the work vehicle or the implement to perform an appropriate operation (e.g., stopping the operation, adjustment of the position and/or attitude of the implement, signal transmission to an external device) that is adapted to that state.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a diagram showing an example of the operation of and communications among a tractor, an implement, and a server.

FIG. 15 is a flowchart showing another exemplary operation of the tractor.

FIG. 16 is a diagram showing an example of data to be transmitted from the tractor to the server.

DETAILED DESCRIPTION OF THE PREFERRED EMBODIMENTS

Figure 1:
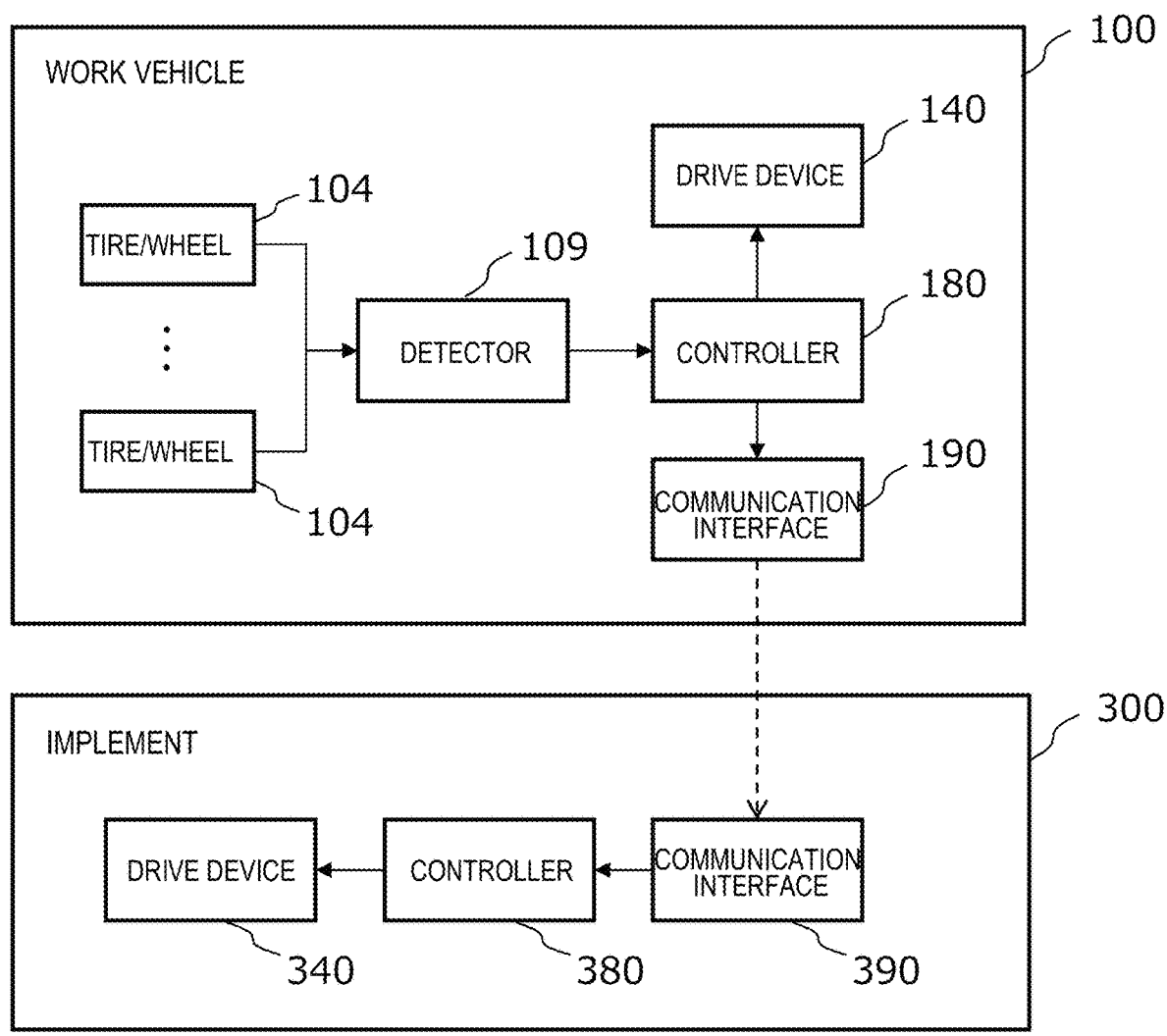
FIG. 1 is a block diagram showing a schematic configuration of a work vehicle and an implement according to a preferred embodiment of the present disclosure.

An agricultural machine according to an illustrative preferred embodiment of the present disclosure includes one or more tires, a detector to detect a low pressure state in which a tire pressure of the tires is lower than a reference range or a high pressure state in which the tire pressure is higher than the reference range, and a controller. The controller is configured or programmed to control an operation of at least one of the agricultural machine and an additional agricultural machine to be linked to that agricultural machine. Either that agricultural machine (which may hereinafter be referred to as a "first agricultural machine") or the additional agricultural machine (which may hereinafter be referred to as a "second agricultural machine") is a work vehicle (e.g., a tractor) that is capable of self-driving. The other one of the first agricultural machine and the second agricultural machine is an implement to be linked to the work vehicle in use. Upon detecting that the tire pressure of the one or more tires is in a low pressure state in which the tire pressure is lower than a reference range or in a high pressure state in which the tire pressure is higher than the reference range, the controller causes the at least one of the first agricultural machine and the second agricultural machine to perform a specific operation that is different from an operation to be performed when the tire pressure is in the reference range. The specific operation may be defined by a computer program recorded in a storage device that is included in the agricultural machine. By executing the computer program, the controller performs the pre-designated specific operation when the tire pressure is outside the reference range. The specific operation may include operations such as a stopping operation, decelerating, raising or lowering a linkage device that links the first agricultural machine and the second agricultural machine together, changing the control gain for determining a steering angle in automatic steering, changing the timing(s) of enabling 4WD and/or locking differential, transmitting a signal or data to an external device, for example.

In the present specification, a state in which the pressure of a tire of the agricultural machine is within the reference range is referred to as a "normal state", a state in which the pressure is lower than the reference range is referred to as a "low pressure state", and a state in which the pressure is higher than the reference range is referred to as a "high pressure state". A "state in which the pressure is lower than the reference range" is a state in which the pressure is less than the lower limit value of the reference range. A "state in which the pressure is higher than the reference range" is a state in which the pressure is greater than the upper limit value of the reference range. A specific operation that is performed by the agricultural machine or the additional agricultural machine when a low pressure state is detected may be referred to as a "low-pressure operation", and a specific operation that is performed by the agricultural machine or the additional agricultural machine when a high pressure state is detected may be referred to as a "high-pressure operation". In the present specification, both a low pressure state and a high pressure state may collectively be referred to as "abnormal pressures".

In the present specification, a "tire" includes the combination of a wheel and a tire that is mounted on the wheel. A tire is typically made of an elastic body, e.g., rubber. A tire is to be used in a state where it is inflated with a gas, e.g., air, that fills the interior of the tire. The pressure of the tire interior in this state is referred to as the "pressure of the tire" or the "tire pressure". The tire may be filled with a gas of a different composition from that of air, such as nitrogen gas.

A "low pressure state", where the pressure of a tire is lower than the reference range, may be a state where the tire has a puncture, or a state where the tire does not have a puncture but has a pressure which is lower than normally. A "high pressure state", where the pressure of a tire is higher than the reference range, may occur when a user has filled the tire with more air or gas than is appropriate, or if a tire pressure that was within the reference range when the atmospheric temperature was low has exceeded the reference range due to a rise in the atmospheric temperature, for example. When the pressure of at least one of the tires of the first agricultural machine is lower than the reference range, the detector determines that a "low pressure state" exists, and when the pressure is higher than the reference range, the detector determines that a "high pressure state" exists. The detector may only detect a low pressure state, only detect a high pressure state, or detect both a low pressure state and a high pressure state.

The "reference range" may be a range bounded by a lower limit value and an upper limit value, e.g., "not less than 120 kPa and not more than 160 kPa". Without being limited to such an example, the "reference range" may be a range that only has a lower limit value. For example, a range expressed as "not less than 120 kPa" may be set as the reference range. When the reference range only has a lower limit value and no upper limit value, the detector may determine that the tire is in a low pressure state in which the pressure of the tire is less than the lower limit value, and that the tire is in a normal state when the pressure of the tire is equal to or greater than the lower limit value. In such an implementation, where no upper limit value exists, a "high pressure state" will never be detected. Thus, the detector may only detect a low pressure state, without detecting a high pressure state.

The detector may be able to directly measure the pressure of each tire by utilizing a pressure sensor that measures the pressure of each tire, for example. Alternatively, the detector may indirectly measure or estimate the pressure of a tire based on a difference between a vehicle velocity that is estimated based on a position which is acquired from a localization device utilizing a positioning system such as a GNSS, a camera, a LiDAR sensor, etc. (which may hereinafter be referred to as an "estimated vehicle velocity"), and a velocity that is calculated from a rotational speed of the wheel axis and the circumference of the tire in a normal state (which may hereinafter be referred to as a "theoretical vehicle velocity"), for example. Specifically, if the absolute value of the difference between the estimated vehicle velocity and the theoretical vehicle velocity exceeds a threshold value, it may be determined that the pressure of the tire has deviated from the reference range. If a value obtained by subtracting the theoretical vehicle velocity from the estimated vehicle velocity exceeds a positive threshold value, the detector may determine that the tire pressure is higher than the reference range. If a value obtained by subtracting the theoretical vehicle velocity from the estimated vehicle velocity is below a negative threshold value, the detector may determine that the tire pressure is lower than the reference range.

The pressure of a tire may vary depending on a variety of conditions, such as the atmospheric temperature, the state of the road surface, the traveling environment, the content of the task, or the cargo weight. Therefore, the measured value or estimated value of the pressure of a tire may not be a momentary value at a given point in time, but be a representative value (e.g., a mean value or a median) of values obtained over a somewhat long period of time (e.g., 1 minute or longer, 10 minutes or longer, 1 hour or longer, 1 day or longer). The lower limit value and the upper limit value of the "reference range", against which a tire is determined to be in a low pressure state or a high pressure state, may advantageously be set to appropriate values in accordance with a variety of conditions as aforementioned. Therefore, the detector may change the reference range based on at least one condition selected from the atmospheric temperature, the state of the road surface, traveling environment, the content of the task, and the cargo weight.

In the case where the agricultural machine includes a plurality of tires, each tire may have a different recommended value of pressure. For example, the recommended value of pressure may differ between the front wheels and the rear wheels. In that case, a reference range may be set for each tire. The reference range of pressure for each tire may be set to a range from about 90% to about 110% of a highest internal pressure that is prescribed for that tire in use, for example. In applications where punctures are to be detected, the lower limit value of the reference range is set to a relatively low value. On the other hand, in applications where a state in which the tire pressure is lower than in a normal state (without resulting in a puncture) is to be detected, the lower limit value of the reference range is set to a relatively high value. In applications where a high pressure state of the tire is to be detected, the upper limit value of the reference range is set to a value that exceeds 100% of a highest internal pressure that is prescribed for that tire in use.

In the present specification, the term "self-driving" includes driving based on the action of a controller which is included within the movable unit (e.g., an agricultural machine), and also traveling based on commands coming from a controller in a system that manages the operating schedule of the movable unit. The controller may control operations that are needed to perform the travel, e.g., steering, velocity control, and beginning or stopping travel. Self-driving includes not only a movement of the movable unit toward a destination along a predetermined path, but also a movement of merely following a target of tracking. Moreover, the movable unit may temporarily be moving based on instructions from a human worker. Any steering of the movable unit that is based on the action of a controller, rather than manually, is referred to as "automatic steering". In the present specification, "self-driving" is a notion that encompasses "automatic steering". In other words, a kind of travel in which only the steering needed for the travel is performed automatically while all other operations such as velocity control, beginning or stopping travel, etc., are performed manually also qualifies as "self-driving". A portion or an entirety of the controller may be external to the movable unit. Communications of control signals, commands, data, or the like may be performed between the movable unit and the controller lying external to the movable unit. In the present specification, "autonomous driving" includes traveling while sensing the surrounding environment, without any human intervention in the travel control. In the present specification, "self-driving" is a notion that encompasses "autonomous driving". An agricultural machine that is capable of autonomous driving is able to travel unmanned within the field. During autonomous driving, operations of obstacle detection and obstacle avoidance may be performed.

If the detector detects an abnormal pressure (i.e., a low pressure state or a high pressure state) of a tire while the work vehicle is performing self-driving or autonomous driving, the controller causes one or both of the first agricultural machine and the second agricultural machine to perform a predetermined specific operation(s). For example, when an abnormal pressure is detected, the controller may stop the operation of one or both of the first agricultural machine and the second agricultural machine, or change the position and/or attitude of the implement. The position and/or attitude of the implement can be changed by driving a linkage device that links the work vehicle and the implement together, for example. When an abnormal pressure is detected during travel, the controller may transmit to an external device a signal (or an alert) indicating that a low pressure state has emerged. The external device may be a server computer in a system that manages the operating schedule of the work vehicle, or a computer used by the user, e.g., an information terminal.

With the above configuration, if the pressure of a tire of the work vehicle or the implement has deviated from the reference range as the implement is performing a predetermined task while the work vehicle is self-driving, this state can be quickly detected, and the work vehicle and/or the implement can be made to perform a necessary operation, such as halting, adjustment of the position and/or attitude, or signal transmission to an external device. With such an operation, when a tire problem such as a puncture or an abnormally high pressure has occurred, it is easy to detect this state early on and take necessary measures.

In a low pressure state, where the pressure of the tire is lower than the reference range, the position of the implement becomes lower than the expected position. Conversely, in a high pressure state, where the pressure of the tire is higher than the reference range, the position of the implement becomes higher than the expected position. Therefore, in a state where an abnormal pressure of the tire has occurred, preciseness of the task performed by the implement may become poorer, the implement may come into contact with the crop, or other problems may occur. If travel is continued while remaining in a low pressure state or a high pressure state, problems may occur, such as damage to the tire and the wheel accumulating without the user noticing it. By applying one or more of the techniques of various example preferred embodiments of the present disclosure, such problems can be avoided.

In the above configuration, the first agricultural machine may include a localization device to estimate the position of the first agricultural machine during travel. When a low pressure state (e.g., a puncture state) or a high pressure state is detected, the controller may transmit to an external device a signal indicating that a low pressure state or a high pressure state is detected, and information indicating the position of the first agricultural machine. Such a configuration allows the external device to be notified as to which position in the field the tire problem has occurred. Upon receiving the notification, the external device can record the place where the tire problem has occurred. This makes it easier for a human worker to immediately go to the site, or when working the next time, resume the task from that place onwards, for example.

Thus, the first agricultural machine detects an abnormal pressure of at least one tire that it includes, and in accordance with the detection result, controls the operation of at least one of the first agricultural machine itself and the second agricultural machine. This function may be implemented in either one of the work vehicle and the implement. The work vehicle and the implement may both possess the aforementioned function. In the case where communications based on communication control standards such as ISOBUS based on ISO 11783 are possible between the work vehicle and the implement, for example, it is possible to control the implement from the work vehicle, or conversely, control the work vehicle from the implement.

FIG. 1 is a block diagram schematically showing an example configuration where the first agricultural machine is a work vehicle 100 that is capable of self-driving and the second agricultural machine is an implement 300 to be linked to the work vehicle 100 in use. The work vehicle 100 in this example includes one or more wheels 104, a detector 109 to detect an abnormal pressure of each tire of the wheels 104, a drive device 140, a controller 180, and a communication interface (I/F) 190. The drive device 140 includes devices that are needed for driving the work vehicle 100 and the implement 300, such as a prime mover, a transmission, a steering device, and a linkage device, for example. The controller 180 is a device that includes a processor, e.g., an electronic control unit (ECU). In the following description, the controller 180 may be referred to as the ECU 180. The communication IF 190 is a circuit to perform communications with a communication IF 390 of the implement 300. The implement 300 includes a drive device 340, a controller 380, and a communication IF 390. The drive device 340 includes devices adapted to the intended use of the implement 300, e.g., a pump, a hydraulic device, or an electric motor. The controller 380 controls the drive device 340 based on a control signal received from the work vehicle 100. The communication IF 390 is a circuit to perform communications with the communication IF 190 of the work vehicle 100.

In the example shown in FIG. 1, when an abnormal pressure of at least one tire 104 is detected by the detector 109 while the work vehicle 100 is self-driving, the controller 180 can perform at least one of an operation of halting or decelerating the work vehicle 100, an operation of adjusting the position and/or attitude of the implement 300, and an operation of halting or decelerating the implement 300, for example. Specifically, when an abnormal pressure is detected, the controller 180 can halt or decelerate the work vehicle 100 by controlling the drive device 140. Also when an abnormal pressure is detected, the controller 180 can change the position and/or attitude of the implement 300 by raising or lowering a linkage device included in the drive device 140. Herein, a position of the implement 300 is a relative position of the implement 300 with respect to the position of the work vehicle 100. In the case where the implement 300 is a sprayer for spraying a chemical agent over the crop, for example, if a low pressure state is detected while the work vehicle 100 is self-driving, the controller 180 may perform an operation of preventing the sprayer from coming into contact with the crop by changing the position and/or attitude of the sprayer. The controller 180 may transmit from the communication IF 190 to the implement 300 a control signal to stop or restrict the operation of the implement 300. When this control signal is received, the controller 380 of the implement 300 controls the drive device 340 to stop or restrict the operation of the implement 300. In this example, when an abnormal pressure of a tire 104 is detected, the controller 180 may transmit to an external computer a signal indicating that an abnormal pressure has occurred. The signal may contain positional information of the work vehicle 100 or the implement 300.

When a low pressure state or a high pressure state is detected, the controller 180 may change the control gain for determining the steering angle in automatic steering, in accordance with the tire pressure. When the work vehicle 100 is traveling by automatic steering, the controller 180 controls the steering angle so as to reduce the deviation between a pre-designated intended travel path and an estimated position of the work vehicle 100 as acquired from a positioning system or a localization device. The deviation is the distance between the estimated position of the work vehicle 100 and the intended travel path. In the present specification, the ratio of steering angle to deviation is referred to as the "control gain for determining the steering angle", or alternatively as the "steering gain". In a low pressure state, where the tire pressure is lower than the reference range, the grip of the tire 104 increases relative to the case where the tire pressure is within the reference range, thus making it easier to turn. Therefore, if a low pressure state is detected during automatic steering or when beginning automatic steering, the controller 180 may decrease the steering gain. Conversely, in a high pressure state, where the tire pressure is higher than the reference range, the grip of the tire 104 decreases relative to the case where the tire pressure is within the reference range, thus making it more difficult to turn. Therefore, if a high pressure state is detected during automatic steering or when beginning automatic steering, the controller 180 may increase the steering gain. The controller 180 may flexibly adjust the steering gain in accordance with the magnitude of the detected tire pressure when a low pressure state or a high pressure state is detected. With such control, even when the tire pressure deviates from the reference range, running properties can be obtained as expected.

The work vehicle 100 may typically include two front wheels and two rear wheels. In order to facilitate turning, the work vehicle 100 may include a differential in at least one of the front wheel(s) or the rear wheel(s). The differential may include a locking differential. The differential includes a plurality of differential gears to rotate the right and left driving wheels at different speeds, thus suppressing slipping of the driving wheels during a turn. The locking differential is a device which, when a large difference exists between the rotational speeds of the right and left driving wheels, disables the function of the differential. When one of the driving wheels spins out on soft or rough terrains, for example, activating the locking differential can promote the ability to escape. In the case where the work vehicle 100 is a four-wheel drive vehicle, a differential including a locking differential may be incorporated on both the front wheels and the rear wheels. The locking differential(s) may be enabled through user manipulation, or the controller 180 may automatically enable it depending on the state of the work vehicle 100. The controller 180 may enable the locking differential when a specific condition is satisfied, e.g., when the difference between the rotational speeds of the right and left driving wheels has exceeded a pre-designated threshold value. The controller 180 may have the functionality of automatically switching between the two-wheel drive (2WD) mode and the four-wheel drive (4WD) mode in accordance with the state of the work vehicle during travel. For example, it may switch to a 4WD mode when the velocity of the work vehicle 100 has become lower than a predetermined value, and it may switch to a 2WD mode when the velocity has become equal to or greater than the predetermined value. Alternatively, if the occurrence of a slip is detected in the 2WD mode, this detection being based on the position of the work vehicle 100 or the rotating state of each tire, it may switch to the 4WD mode.

Thus, in the case where the work vehicle 100 includes a locking differential, the controller 180 may change the timing of activating the locking differential in accordance with the tire pressure of the at least one tire 104. For example, when a low pressure state or a high pressure state is detected with respect to at least one tire 104, the controller 180 may change the timing of activating the locking differential from that in the case where the tire pressure is within the reference range. In the case where the work vehicle 100 is a four-wheel drive vehicle, the controller 180 may change the timing of switching between 2WD and 4WD in accordance with the tire pressure of at least one tire 104. For example, when a low pressure state or a high pressure state is detected with respect to at least one tire 104, the controller 180 may change the timing of switching between 2WD and 4WD from that in the case where the tire pressure is within the reference range.

In a low pressure state, where the tire pressure is lower than the reference range, the grip of the tire 104 increases relative to the case where the tire pressure is within the reference range. Therefore, when a low pressure state is detected, the controller 180 may advantageously adjust the timing of enabling the locking differential to be later than that in the case where the tire pressure is within the reference range. Similarly, when a low pressure state is detected, the controller 180 may advantageously adjust the timing of switching from 2WD to 4WD to be later than that in the case where the tire pressure is within the reference range. With such control, it becomes easier to avoid undesirable situations, e.g., deviation from the intended path due to an increased grip.

Conversely, in a high pressure state, where the tire pressure is higher than the reference range, the grip of the tire 104 decreases relative to the case where the tire pressure is within the reference range. Therefore, when a high pressure state is detected, the controller 180 may advantageously adjust the timing of enabling the locking differential to be sooner than that in the case where the tire pressure is within the reference range. Similarly, when a high pressure state is detected, the controller 180 may advantageously adjust the timing of switching from 2WD to 4WD to be sooner than that in the case where the tire pressure is within the reference range. With such control, it becomes easier to avoid undesirable situations, e.g., slips and deviation from the intended travel path due to a reduced grip.

Figure 2:
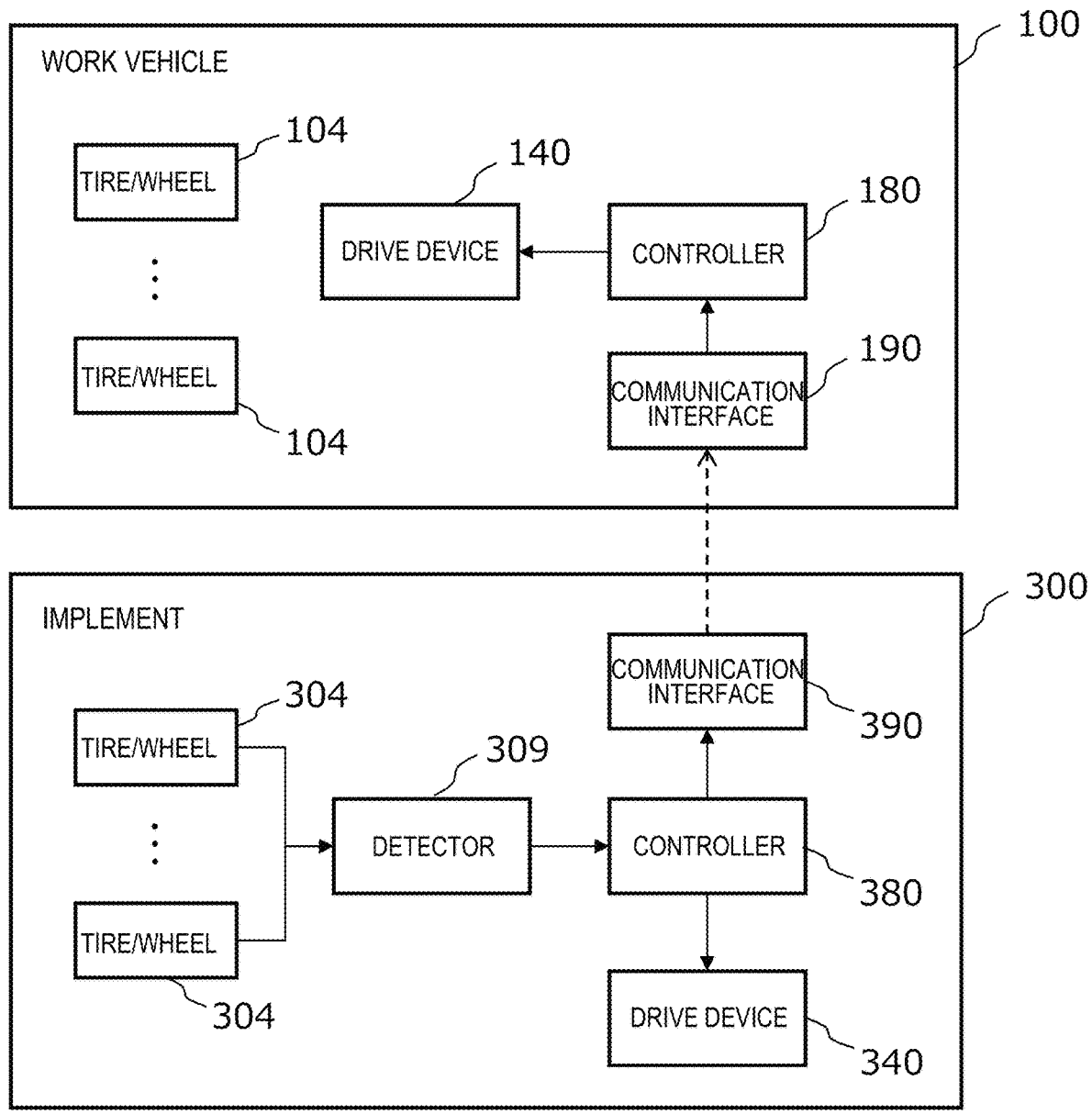
FIG. 2 is a block diagram showing a schematic configuration of a work vehicle and an implement according to another preferred embodiment of the present disclosure.

FIG. 2 is a block diagram schematically showing an example configuration where the second agricultural machine is a work vehicle 100 that is capable of self-driving and the first agricultural machine is an implement 300 to be linked to the work vehicle 100 in use. In this example, the work vehicle 100 does not include a detector 109 to detect an abnormal pressure of a tire 104. Alternatively, the implement 300 includes one or more tires 304 and a detector 309 to detect an abnormal pressure of each tire of the tires 304.

The controller 380 of the implement 300 performs a similar control to that performed by the controller 180 of the work vehicle in the example of FIG. 1. In other words, when an abnormal pressure of at least one tire 304 is detected by the detector 309 while the work vehicle 100 is self-driving, the controller 380 can perform at least one of an operation of halting or decelerating the work vehicle 100, an operation of causing the work vehicle 100 to adjust the position and/or attitude of the implement 300, and an operation of halting or decelerating the implement 300. Specifically, when an abnormal pressure of a tire 304 is detected, the controller 380 can halt or decelerate the implement 300 by controlling the drive device 340. Also when an abnormal pressure is detected, the controller 380 can transmit a control signal from the communication IF 390 to the work vehicle 100, thus halting or decelerating the work vehicle 100 or raising or lowering the linkage device to change the position and/or attitude of the implement 300. In the case where the implement 300 is a sprayer to spray a chemical agent over the crop, for example, the controller 380 may transmit a control signal from the communication IF 390 to the work vehicle 100, thus causing an operation of preventing the sprayer from coming into contact with the crop by changing the position and/or attitude of the sprayer to be performed.

Alternatively, when an abnormal pressure of a tire 304 is detected, the controller 380 may transmit to an external computer a signal indicate that a low pressure has emerged. The signal may contain positional information of the work vehicle 100 or the implement 300. Location information may be acquired by using a GNSS, a camera, a LiDAR sensor, etc., for example.

Figure 3:
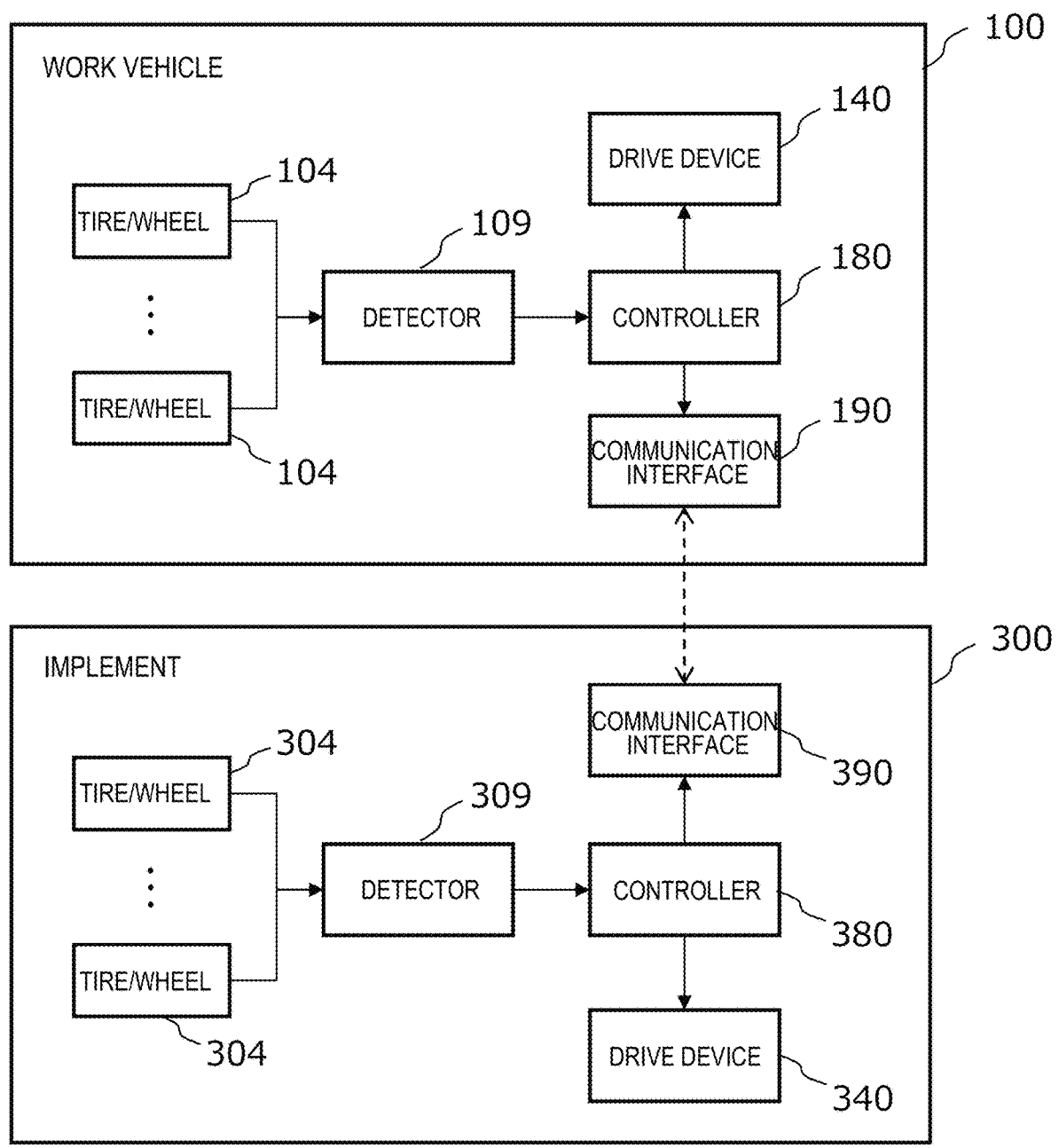
FIG. 3 is a block diagram showing a schematic configuration of a work vehicle and an implement according to still another preferred embodiment of the present disclosure.

FIG. 3 is a block diagram schematically showing an example configuration in which both the work vehicle 100 and the implement 300 have the function of detecting an abnormal pressure of a tire. In this example, both the work vehicle 100 and the implement 300 include a detector (109 and 309, respectively) to detect an abnormal pressure of their respective wheels 104 and 304. By any of the aforementioned methods, the detector 109 or 309 respectively detects an abnormal pressure of at least one tire 104 or 304. Bidirectional communications are performed between the communication IFs 190 and 390. Such communications are possible in the case where the work vehicle 100 and the implement 300 support a tractor-implement management (TIM) system, e.g., ISOBUS-TIM. Similarly to the example of FIG. 1, when an abnormal pressure of at least one tire 104 is detected, the controller 180 performs a specific control, e.g., stopping the operation of the work vehicle 100 and/or the implement 300, adjusting the position and/or attitude of the implement 300, or transmitting a signal to an external device. As for the controller 380, similarly to the example of FIG. 2, when an abnormal pressure of at least one tire 304 is detected, the controller 380 performs a specific control, e.g., stopping the operation of the implement 300 or transmitting a signal to the work vehicle 100 or an external device. With such a configuration, each of the work vehicle 100 and the implement 300 is able to timely detect a low pressure state (e.g., a tire puncture) or a high pressure state, and perform an appropriate operation.

The detector may use one reference value, or alternatively two or more reference values, in determining a tire to be in a low pressure state or a high pressure state. For example, the detector may detect a first low pressure state in which the pressure of the tire is lower than a first reference value that corresponds to the lower limit value of the aforementioned reference range, and/or a second low pressure state in which the pressure of the tire is lower than a second reference value that is smaller than the first reference value. When a first low pressure state is detected while the work vehicle is self-driving, the controller may cause at least one of the first agricultural machine and the second agricultural machine to perform a first operation, and when a second low pressure state is detected while at least one of the first agricultural machine and the second agricultural machine is self-driving, the controller may cause at least one of the first agricultural machine and the second agricultural machine to perform a second operation which is different from the first operation. The first low pressure state may be a state in which the tire pressure is lower than in a normal state but which does not involve a puncture, and the second low pressure state may be a state where the tire has a puncture, for example. The first operation may be an operation of decelerating the work vehicle and the implement, or adjusting the attitude of the implement, for example. The second operation may be an operation of halting the work vehicle and the implement, for example. Each of the first operation and the second operation may include an operation of transmitting a signal or data corresponding to the respective state to an external device. The detector may evaluate the pressure of the tire against three or more references. In that case, depending on the pressure level of the tire, the controller may cause the work vehicle and/or the implement to perform three or more different operations. Thus, in a configuration where multiple reference values are set, the detector may change each reference value in accordance with the traveling environment or the content of the task, etc.

The detector may continuously measure or estimate the pressure of the tire, and, based on the pattern of temporal change in the measured values or estimated values (e.g., a rate of change of pressure over time), predict the timing at which the pressure of the tire will become lower than the reference value, or estimate the probability of occurrence of a puncture. Such prediction or estimation may be performed by using a machine learning algorithm such as deep learning, for example. In accordance with the predicted timing or the probability of occurrence of a puncture, the detector may send an alert to an external device. Alternatively, the detector may continuously transmit measured values or estimated values of the pressure of the tire to an external computer (e.g., a cloud server or an edge server), and the computer may perform the prediction or estimation as aforementioned. By introducing such a mechanism, it becomes possible for the user to recognize early on a lowering of the pressure of the tire or a tire deterioration, and before any problem occurs, perform a necessary task such as filling the tire with air or exchanging the tire. Thus, using one or more of the techniques of various example preferred embodiments of the present disclosure may make enable predictive maintenance of the tires of the work vehicle or the implement.

A control system for realizing the aforementioned operation of the work vehicle or the implement may be mounted on the work vehicle or the implement as an add-on. Alternatively, such a control system may be provided at a place which is remote from the work vehicle and the implement. In other words, the aforementioned functionality may be realized as an external control system gives a command to the work vehicle or the implement, assuming that the work vehicle or the implement has a communication function. Such a system would include a detector to detect that a tire of the work vehicle or the implement is in a low pressure state or a high pressure state, and a controller to, when a low pressure state or a high pressure state is detected while the work vehicle is self-driving, cause when a low pressure state or a high pressure state is detected while the work vehicle is self-driving, cause at least one of the work vehicle and the implement to perform a specific operation that is different from an operation to be performed when the tire pressure is in the reference range.

The present disclosure also encompasses a method of causing the work vehicle or the implement to perform the aforementioned operation. Such a method includes a step of detecting that a tire of the work vehicle or the implement is in a low pressure state or a high pressure state, and a step of, when a low pressure state or a high pressure state is detected while the work vehicle is self-driving, causing at least one of the work vehicle and the implement to perform a specific operation that is different from an operation to be performed when the tire pressure is in the reference range.

The present disclosure also encompasses a computer program for causing the work vehicle or the implement to perform the aforementioned operation. Such a computer program is stored on a non-transitory computer-readable storage medium, so as to be executed by a computer that controls a work vehicle that is capable of self-driving, or an implement to be linked to the work vehicle in use. The computer program causes the computer to perform a step of detecting that a tire of the work vehicle or the implement is in a low pressure state or a high pressure state, and, a step of, when a low pressure state or a high pressure state is detected while the work vehicle is self-driving, causing at least one of the work vehicle and the implement to perform a specific operation that is different from an operation to be performed when the tire pressure is in the reference range.

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

Preferred Embodiment 1

A first preferred embodiment of the present disclosure will be described. In the present preferred embodiment, as in the example illustrated in FIG. 1, the first agricultural machine is a work vehicle that is capable of self-driving, and the second agricultural machine is an implement to be linked to the work vehicle. Hereinafter, mainly with respect to an example where the work vehicle is a tractor for use in a task to be performed at an orchard such as a vineyard, the configuration and operation according to the present preferred embodiment will be described.

Figure 4:
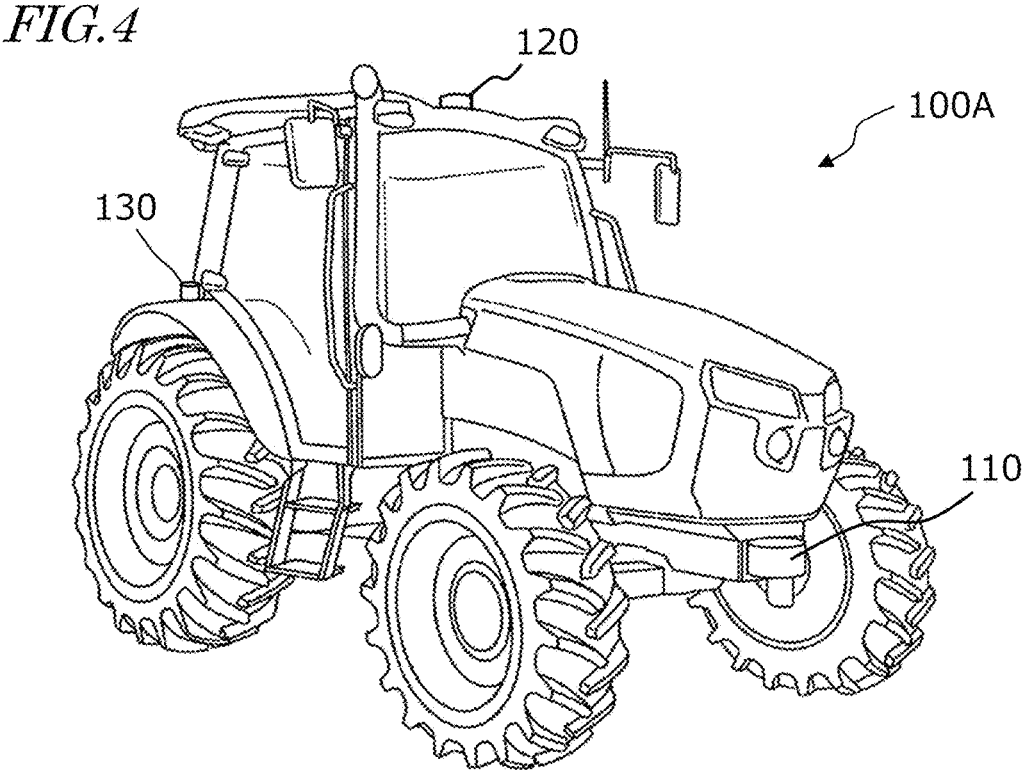
FIG. 4 is a perspective view showing an exemplary appearance of a tractor according to a first preferred embodiment of the present disclosure.
Figure 5:
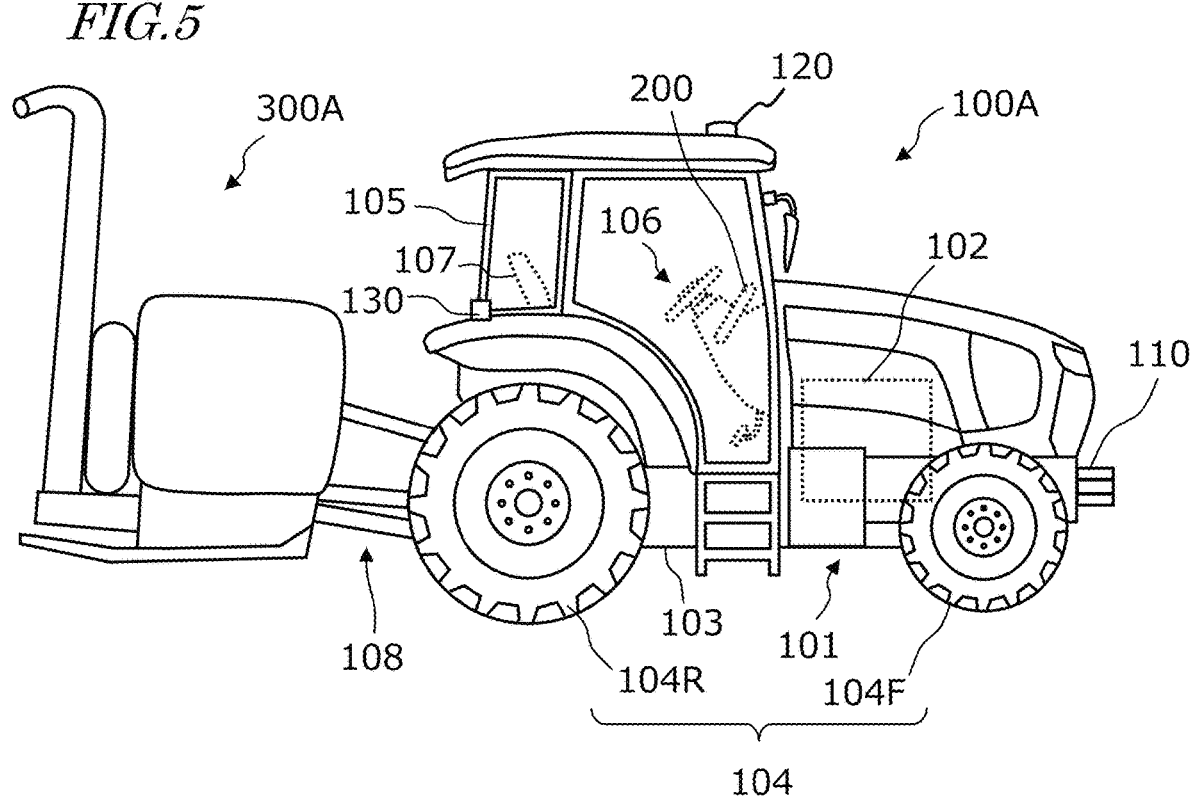
FIG. 5 is a schematic diagram showing the tractor and the implement as viewed in a lateral direction.

FIG. 4 is a perspective view showing an exemplary appearance of a tractor 100A according to an illustrative first preferred embodiment of the present disclosure. FIG. 5 is a schematic diagram showing the tractor 100A and an implement 300A linked to the tractor 100A, as viewed in a lateral direction.

As shown in FIG. 4, the tractor 100A in the present preferred embodiment includes a LiDAR sensor 110, a GNSS unit 120, and one or more obstacle sensors 130. Although one obstacle sensor 130 is shown in the example of FIG. 4, obstacle sensors 130 may be provided at a plurality of positions of the tractor 100A.

As shown in FIG. 5, the tractor 100A includes a vehicle body 101, a prime mover (engine) 102, and a transmission 103. On the vehicle body 101, wheels 104 and a cabin 105 are provided. The wheels 104 include a pair of front wheels 104F and a pair of rear wheels 104R. Inside the cabin 105, a driver's seat 107, a steering device 106, and an operational terminal 200 are provided. Either pair of the front wheels 104F or the rear wheels 104R may be crawlers, rather than tires. In the following description, the tractor 100A is a four-wheel drive vehicle having four wheels 104 as driving wheels.

The LiDAR sensor 110 is used for localization purposes. The tractor 100A in the present preferred embodiment is used in an environment (e.g., a vineyard) in which trees are distributed with a high density. In such an environment, leaves thriving in upper portions of the trees create canopies, each of which serves as an obstacle or a multiple reflector against radio waves from a satellite. Such an environment hinders accurate positioning using a GNSS. In order to enable localization even in such an environment, the tractor 100A includes the LiDAR sensor 110. Through matching between sensor data which is output from the LiDAR sensor 110 and environment map data that is prepared in advance, the position of tractor 100A can be estimated. The environment map data is data expressing positions or regions of objects, based on a predetermined coordinate system, within an environment that is traveled by the tractor 100A. The environment map data may simply be referred to as an "environment map". The environment map can be generated by using SLAM (Simultaneous Localization and Mapping) technique, where localization and map generation simultaneously take place. Although the LiDAR sensor 110 in the present preferred embodiment is illustrated as being disposed in a lower portion of the front face of the vehicle body 101, it may be disposed at any other position. While the tractor 100A is moving, the LiDAR sensor 110 repeatedly outputs sensor data indicating a distribution of objects existing in the surrounding environment. The sensor data may contain information of distances and directions of a plurality of points, or two-dimensional or three-dimensional coordinate values of a plurality of points, for example. The sensor data which is output from the LiDAR sensor 110 is processed by a controller (e.g., an ECU (Electronic Control Unit)) that is mounted in the tractor 100A. Through matching between the group of points indicated by the controller sensor data and the environment map having been prepared in advance, the position of the tractor 100A can be estimated.

The GNSS unit 120 is a GNSS receiver that includes an antenna to receive signals from a GNSS satellite and a processing circuit. The GNSS unit 120 receives GNSS signals which are transmitted from a GNSS satellite, such as the GPS (Global Positioning System), GLONASS, Galileo, BeiDou, or QZSS (Quasi-Zenith Satellite System, e.g., MICHIBIKI), and performs positioning based on the signals. Although the GNSS unit 120 in the present preferred embodiment is disposed above the cabin 105, it may be disposed at any other position. The tractor 100A in the present preferred embodiment is mainly used in environments where multiple trees grow to make it difficult to use a GNSS, e.g., a vineyard, which is the reason why the LiDAR sensor 110 is employed in positioning. However, in an environment where it is possible to receive GNSS signals, positioning may be performed by using the GNSS unit 120. By combining the positioning based on the LiDAR sensor 110 and the positioning based on the GNSS unit 120, the stability or accuracy of positioning can be improved.

The tractor 100A may perform only one of the positioning based on the LiDAR sensor 110 and the positioning based on the GNSS unit 120. In that case, the tractor 100A may include only the corresponding one of the LiDAR sensor 110 and the GNSS unit 120.

In the example shown in FIG. 5, the obstacle sensor(s) 130 is provided at the rear of the vehicle body 101. The obstacle sensor(s) 130 may be disposed at any other position than the rear of the vehicle body 101. For example, one or more obstacle sensors 130 may be disposed at any position selected from among the sides of the vehicle body 101, the front of the vehicle body 101, and the cabin 105. The obstacle sensor(s) 130 detects objects that are relatively close to the tractor 100A. Each obstacle sensor 130 may include a laser scanner or an ultrasonic sonar, for example. When an object exists at a position closer to the obstacle sensor 130 than a predetermined distance, the obstacle sensor 130 outputs a signal indicating the presence of an obstacle. A plurality of obstacle sensors 130 may be provided at different positions of the body of the tractor 100A. For example, a plurality of laser scanners and a plurality of ultrasonic sonars may be disposed at different positions of the body. Providing a multitude of obstacle sensors 130 can reduce blind spots in monitoring obstacles around the tractor 100A.

The prime mover 102 may be a diesel engine, for example. Instead of a diesel engine, an electric motor may be used. The transmission 103 can change the propulsion and moving velocity of the tractor 100A through a speed changing mechanism. The transmission 103 can also switch between forward travel and backward travel of the tractor 100A.

The steering device 106 includes a steering wheel, a steering shaft connected to the steering wheel, and a power steering device to assist in the steering by the steering wheel. The front wheels 104F are the wheels responsible for steering, such that changing their steering angle can cause a change in the traveling direction of the tractor 100A. The steering angle of the front wheels 104F can be changed by manipulating the steering wheel. The power steering device includes a hydraulic device or an electric motor to supply an assisting force for changing the steering angle of the front wheels 104F. When self-driving (including automatic steering) is performed, under the control of an electronic control unit (ECU) disposed in the tractor 100A, the steering angle may be automatically adjusted by the power of the hydraulic device or electric motor.

A linkage device 108 is provided at the rear of the vehicle body 101. The linkage device 108 may include, e.g., a three-point linkage (also referred to as a "three-point link" or a "three-point hitch"), a PTO (Power Take Off) shaft, and a universal joint. The linkage device 108 allows the implement 300A to be attached to or detached from the tractor 100A. The linkage device 108 is able to raise or lower the three-point linkage device with a hydraulic device, for example, thus controlling the position and/or attitude of the implement 300A. Moreover, motive power can be sent from the tractor 100A to the implement 300A via the universal joint. While towing the implement 300A, the tractor 100A allows the implement 300A to perform a predetermined task. The linkage device may be provided frontward of the vehicle body 101. In that case, the implement may be connected frontward of the tractor 100A. In the case where the LiDAR sensor 110 is used while the implement is connected frontward of the tractor 100A, the LiDAR sensor 110 is to be disposed at a position where the laser beam emitted from the LiDAR sensor 110 is not obstructed by the implement.

Although the implement 300A shown in FIG. 5 is a sprayer that sprays a chemical agent over the crop, the implement 300A is not limited to a sprayer. For example, any arbitrary implement such as a mower, a seeder, a spreader, a rake, a baler, a harvester, a plow, a harrow, or a rotary tiller may be connected to the tractor 100A for use.

The tractor 100A in the present preferred embodiment can communicate with an external device. For example, the tractor 100A may communicate with a server computer (hereinafter referred to as a "server") in a farming management system that manages the growth status of crops, the operating status of the tractor 100A, task recording, and so on.

Figure 6:
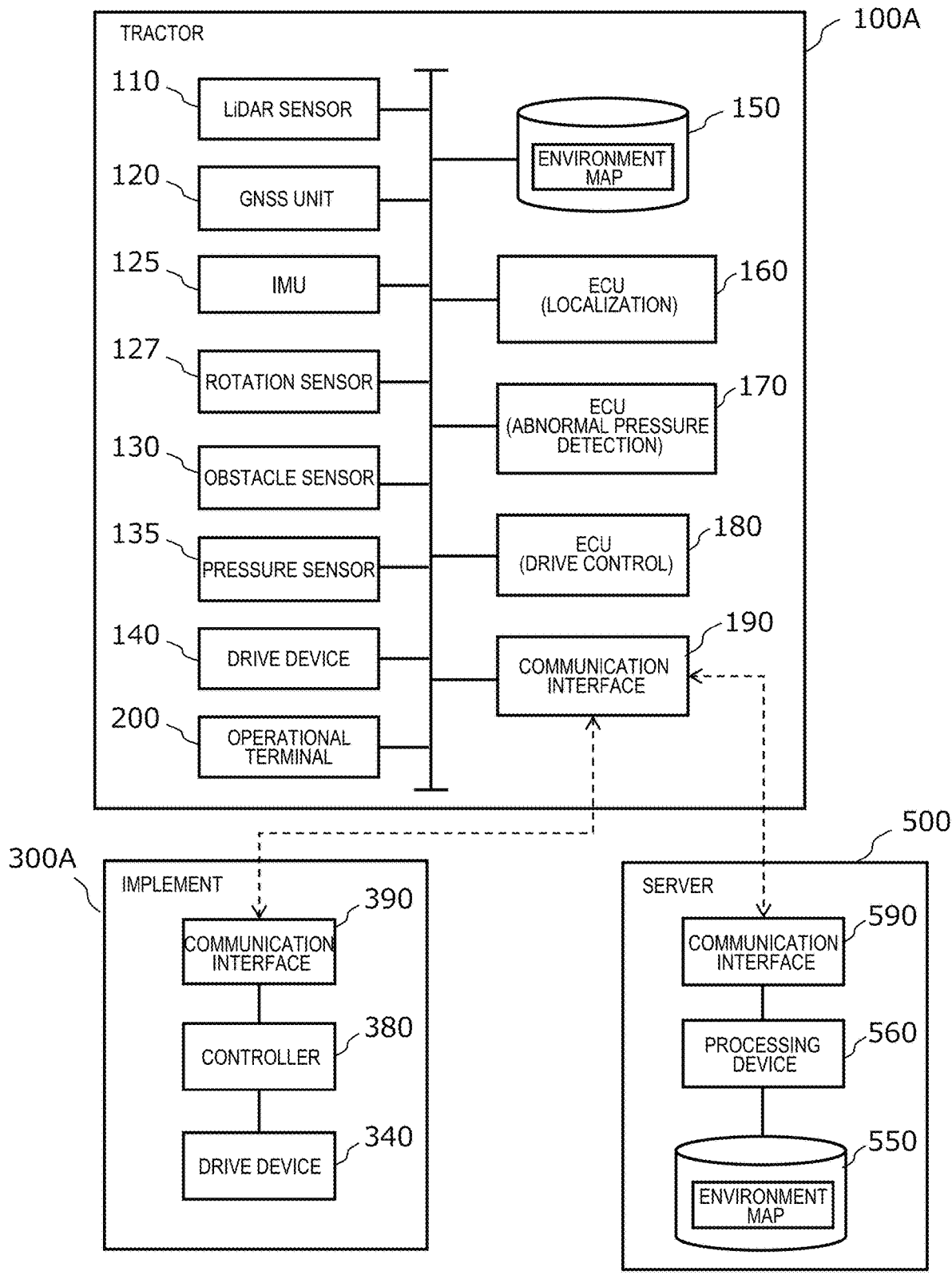
FIG. 6 is a block diagram showing an example of a schematic configuration of a tractor, an implement, and a server.

FIG. 6 is a block diagram showing an example of a schematic configuration of the tractor 100A, the implement 300A, and a server 500. The tractor 100A and the implement 300A can communicate with each other via cables that are included in the linkage device 108. The tractor 100A and the server 500 may communicate with each other via a wired or wireless network, for example.

In addition to the LiDAR sensor 110, the GNSS unit 120, the obstacle sensor(s) 130, and the operational terminal 200, the tractor 100A in this example includes an inertial measurement unit (IMU) 125, a rotation sensor 127, a pressure sensor 135, a drive device 140, a storage device 150, a plurality of electronic control units (ECU) 160, 170 and 180, and a communication interface 190. The implement 300A includes the drive device 340, the controller 380, and the communication interface 390. Note that FIG. 6 shows component elements which are relatively closely related to self-driving by the tractor 100A, detection of an abnormal pressure of a tire(s) 104, and the control after an abnormal pressure is detected, while other component elements are omitted from illustration.

The IMU 125 in the present preferred embodiment includes a 3-axis accelerometer and a 3-axis gyroscope. The IMU 125 functions as a motion sensor which can output signals representing parameters such as acceleration, velocity, displacement, and attitude of the tractor 100A. The IMU 125 may output such signals as frequently as several tens to several thousands times per second, for example. Instead of the IMU 125, a 3-axis accelerometer and a 3-axis gyroscope may be separately provided. Moreover, the GNSS unit 120 and the IMU 125 may be integrated as a single unit that is provided within the tractor 100A.

The rotation sensor 127 is a sensor to measure the rotational speed, i.e., the number of revolutions per unit time, of a wheel axis that is connected to a tire 104. The rotation sensor 127 may be a sensor including a magnetoresistive element (MR), a Hall generator, or an electromagnetic pickup, for example. The rotation sensor 127 may output a numerical value indicating the number of revolutions per minute of the wheel axis (unit: rpm), for example. The rotation sensor 127 is used in order to calculate a theoretical vehicle velocity of the tractor 100A from the rotational speed of the wheel axis and the circumference of the tire 104.

The pressure sensor 135 measures the tire pressure of each tire 104. The pressure sensor 135 may be mounted inside each tire 104 (e.g., the wheel or the air valve). The pressure sensor 135 may be driven by a battery, for example. Alternatively, a battery-less sensor that operates while generating electricity may be used, e.g., a piezoelectric energy harvesting device. The pressure sensor 135 outputs a numerical value indicating the pressure of the interior of each tire of the wheels 104. The pressure sensor 135 may have a wireless communication function. From the pressure sensor 135, a signal indicating the measured pressure value may be wirelessly transmitted to the ECU 170.

For example, the drive device 140 may include various devices that are needed for the traveling of the drive tractor 100A and the driving of the implement 300A, e.g., the aforementioned prime mover 102, transmission 103, differential including a locking differential, steering device 106, and linkage device 108. The prime mover 102 includes an internal combustion engine such as a diesel engine. Instead of an internal combustion engine or in addition to an internal combustion engine, the drive device 140 may include an electric motor that is dedicated to traction purposes.

The storage device 150 includes one or more storage media such as a flash memory or a magnetic disc, and stores various data that are generated by the sensors and the ECUs 160, 170 and 180. The data stored in the storage device 150 includes environment map data. The environment map data is data representing a map of an environment to be traveled by the tractor 100A. In the present specification, the environment map data may simply be referred to as an "environment map". The storage device 150 also stores data such as a computer program(s) to cause the ECUs 160, 170 and 180 to perform various operations (to be described later), and reference values, etc., that are set by the ECU 170. Such a computer program(s) may be provided for the tractor 100A via a storage medium (e.g., a semiconductor memory or an optical disc) or through telecommunication lines (e.g., the Internet). Such a computer program(s) may be marketed as commercial software.

The ECU 160 functions as a localization device to estimate the position of the tractor 100A. Based on the data or signals that are repeatedly output from the LiDAR sensor 110 and the IMU 125 while the tractor 100A is traveling and on the environment map, the ECU 160 can estimate the position and orientation (i.e., the "pose") of the tractor 100A). During self-driving, the ECU 160 utilizes SLAM technology to perform matching between the sensor data that is output from the LiDAR sensor 110 and the environment map data, thus being able to estimate the position and orientation of the tractor 100A. Note that the ECU 160 may determine only the position of the tractor 100A through matching, while the orientation of the tractor 100A may be determined by utilizing the signals from the IMU 125.

The ECU 170 determines whether the tire pressure of each tire 104 is within an appropriate range or not. The ECU 170 functions as the aforementioned "detector". Based on the tire pressure of the tire 104 as measured by the pressure sensor 135, the ECU 170 determines whether or not the tire 104 is in a low pressure state or a high pressure state. If the measured pressure is lower than the reference range, the ECU 170 outputs a signal indicating that the tire 104 is in a low pressure state. If the measured pressure is higher than the reference range, the ECU 170 outputs a signal indicating that the tire 104 is in a high pressure state. Note that part of the functionality of the ECU 170 may reside within the pressure sensor 135. For example, the pressure sensor 135 may include a processor that determines whether the measured pressure value is within the reference range or not. In that case, it may be only if the measured pressure value is lower than the reference range or the measured pressure value is higher than the reference range that the pressure sensor 135 transmits a signal indicating the measured value to the ECU 170; in that case, upon receiving that signal from the pressure sensor 135, the ECU 170 can determine that the tire 104 is in an abnormal pressure.

Without utilizing the pressure sensor 135, the ECU 170 may detect a low pressure state through a comparison (e.g., in terms of a difference or a ratio) between a theoretical vehicle velocity that is calculated from the rotational speed of the tire 104 as measured by the rotation sensor 127 and the circumference of the tire 104 in a normal state, and a velocity calculated from temporal change of the position of the tractor 100A as estimated by the ECU 160 (which may hereinafter be referred to as a "LiDAR vehicle velocity"). For example, when a value obtained by subtracting the theoretical vehicle velocity from the LiDAR vehicle velocity is greater than a pre-designated positive threshold value, it may be determined that a high pressure state has occurred in which the tire pressure of a tire 104 is higher than the reference range. Conversely, when a value obtained by subtracting the theoretical vehicle velocity from the LiDAR vehicle velocity is smaller than a pre-designated negative threshold value, it may be determined that a low pressure state has occurred in which the tire pressure of a tire 104 is lower than the reference range. Alternatively, in an environment where positioning utilizing the GNSS unit 120 is possible, the ECU 170 may detect a low pressure state through a comparison (e.g., in terms of a difference or a ratio) between: a theoretical vehicle velocity; and a velocity estimated based on the data acquired by the GNSS unit 120 (which may hereinafter be referred to as a "GNSS vehicle velocity"). For example, when a value obtained by subtracting the theoretical vehicle velocity from the GNSS vehicle velocity is greater than a pre-designated positive threshold value, it may be determined that a high pressure state has occurred in which the tire pressure of a tire 104 is higher than the reference range. Conversely, when a value obtained by subtracting the theoretical vehicle velocity from the GNSS vehicle velocity is smaller than a pre-designated negative threshold value, it may be determined that a low pressure state has occurred in which the tire pressure of a tire 104 is lower than the reference range. In the case where a plurality of reference values are set for determining a low pressure state or a high pressure state, a corresponding plurality of threshold values may be set.

The ECU 170 may change the reference value in accordance with at least one of the traveling environment of the tractor 100A, and the content of the task to be performed by the implement 300A. As described earlier, the tire pressure of a tire 104 may fluctuate depending on the traveling environment and the content of the task. Therefore, it would be effective to change the reference value(s) according to such conditions.

The ECU 170 may set a plurality of reference values in order to detect an abnormal pressure. Against a plurality of reference values, the tire pressure of a tire 104 may be evaluated in a plurality of levels. For example, if the tire pressure is lower than a first reference value, a first low pressure state may be detected; if the tire pressure is lower than a smaller second reference value, a second low pressure state may be detected; and if the tire pressure is lower than a still smaller third reference value, a third low pressure state may be detected. Thus, in the case where a plurality of reference values are set, the smallest reference value may be associated with a puncture state. In other words, a state where the tire pressure is lower than the smallest reference value may be determined as a puncture state. Each of such a plurality of reference values may be flexibly set in accordance with conditions such as the traveling environment or the content of the task, as aforementioned.

The ECU 180 is a circuit to control the drive device 140. Based on the position and orientation of the tractor 100A as estimated by the ECU 160 and the pre-designated intended travel path, the ECU 180 controls the drive device 140. Moreover, the ECU 180 generates a signal to control the operation of the implement 300A, and transmits that signal from the communication IF 190 to the implement 300A. Furthermore, when the ECU 170 detects a low pressure state or a high pressure state of the tire 104, the ECU 180 causes the tractor 100A and the implement 300A to perform a specific operation (a low-pressure operation or a high-pressure operation) that is different from the operation in a normal state. The low-pressure operation may be one of the following operations, or any arbitrary combination thereof, for example.

halting or decelerating the tractor 100A stopping self-driving of the tractor 100A raising the three-point hitch in the linkage device 108 (preventing the implement 300A from coming into contact with the crop)

stopping the PTO in the linkage device 108 (i.e., interrupting motive power for the implement 300A)

transmitting to the implement 300A a signal to stop the task transmitting a signal to an external computer decreasing the control gain for determining the steering angle in automatic steering adjusting the timing of enabling the locking differential so as to be later adjusting the timing of switching from 2WD to 4WD so as to be later The high-pressure operation is also similar to the low-pressure operation; however, in the case of adjusting the position and/or attitude of the implement 300A by driving the three-point hitch, the ECU 180 lowers the three-point hitch, instead of raising the three-point hitch. This is because, in a high pressure state, conversely to a low pressure state, the position of the implement 300A becomes higher than the position in a normal state. Moreover, the high-pressure operation may be one of the following operations, or any arbitrary combination thereof, for example.

increasing the control gain for determining the steering angle in automatic steering adjusting the timing of enabling the locking differential so as to be sooner adjusting the timing of switching from 2WD to 4WD so as to be sooner Specific examples of such controls will be described later.

In the case where the ECU 170 evaluates a decrease in the tire pressure of a tire 104 against a plurality of reference values, the ECU 180 may perform different operations depending on the degree of decrease in pressure. For instance, as an example control, in a first low pressure state, the attitude of the implement 300A may be adjusted by raising the three-point hitch; in a second low pressure state, a signal to stop the task may be transmitted to the implement 300A; and in a third low pressure state, the tractor 100A and the PTO may be stopped.

The ECUs 160, 170 and 180 may communicate with one another according to a vehicle bus standard such as CAN (Controller Area Network). Although the ECUs 160 and 170 are illustrated as individual corresponding blocks In FIG. 6, each of these functions may be implemented by a plurality of ECUs. Alternatively, a single onboard computer that integrates the functions of the ECUs 160, 170 and 180 may be provided. The tractor 100A may include ECUs other than the ECUs 160, 170 and 180. Any number of ECUs may be provided with functionality.

The communication IF 190 is a circuit that performs communications with the communication IF 390 of the implement 300A and the communication IF 590 of the server 500. The communication IF 190 performs exchanges of signals complying with an ISOBUS standard such as ISOBUS-TIM, for example, between itself and the communication IF 390 of the implement 300A. This causes the implement 300A to perform a desired operation, or allows information to be acquired from the implement 300A. Moreover, the communication IF 190 can communicate with an external computer such as the server 500 via a wired or wireless network.

The operational terminal 200 is a terminal for the user to perform a manipulation related to the self-driving or automatic steering of the tractor 100A, and may be referred to as a virtual terminal (VT). The operational terminal 200 may include a display device such as a touch screen panel, and/or one or more buttons. By manipulating the terminal 200, the user can perform various manipulations, such as switching ON/OFF the self-driving mode or the automatic steering mode, setting an initial position of the tractor 100A, setting a path, recording or editing an environment map, switching between 2WD/4WD, switching ON/OFF the locking differential, and switching ON/OFF the implement 300A. Moreover, a variety of information may be indicated on the operational terminal 200, e.g., the operation states of the tractor 100A and the implement 300A and the pressure state of the tire 104.

The drive device 340 in the implement 300A performs a necessary operation for the implement 300A to perform a predetermined task. The drive device 340 includes devices adapted to the intended use of the implement 300A, e.g., a pump, a hydraulic device, or an electric motor. As shown in FIG. 5, in the case where the implement 300A is a sprayer, the implement 300A includes a nozzle.

The controller 380 controls the operation of the drive device 340. In response to a signal that is transmitted from the tractor 100A via the communication IF 390, the controller 380 causes the drive device 340 to perform various operations. Moreover, a signal that is in accordance with the state of the implement 300A may be transmitted from the communication IF 390 to the tractor 100A.

The server 500 may be a computer, e.g., a cloud server or an edge server, that is installed at a remote place from the tractor 100A and the implement 300A, for example. The server 500 includes a storage device 550, a processing device 560, and a communication IF 590. The communication IF 590 is a circuit for communicating with the tractor 100A via a network 60. For example, the processing device 560 delivers environment map data that is recorded in the storage device 550 from the communication IF 590 to the tractor 100A. The processing device 560 also performs various operations, such as recording tasks of the tractor 100A and the implement 300A, determining intended travel paths for the tractor 100A, and recording growth statuses of crops. In the present preferred embodiment, when a signal indicating that a tire 104 of the tractor 100A is in a low pressure state or a high pressure state is received from the tractor 100A, the processing device 560 records to the storage device 550 a piece of information that is based on that signal. For example, information indicating the date and time, the tire pressure of the tire 104, the position of the tractor 100A, and the like may be recorded. Upon receiving the signal, the processing device 560 may send a notification to an information terminal that is being used by the user. This allows the user to recognize problems of the tire 104 early on.

Next, an example operation of the tractor 100A, the implement 300A, and the server 500 will be described. Herein, an example operation in the case where the tractor 100A detects a low pressure state of a tire 104 during self-driving will mainly be described. The following operation is similarly applicable in the case where the tractor 100A detects a high pressure state of a tire 104.

Figure 7:
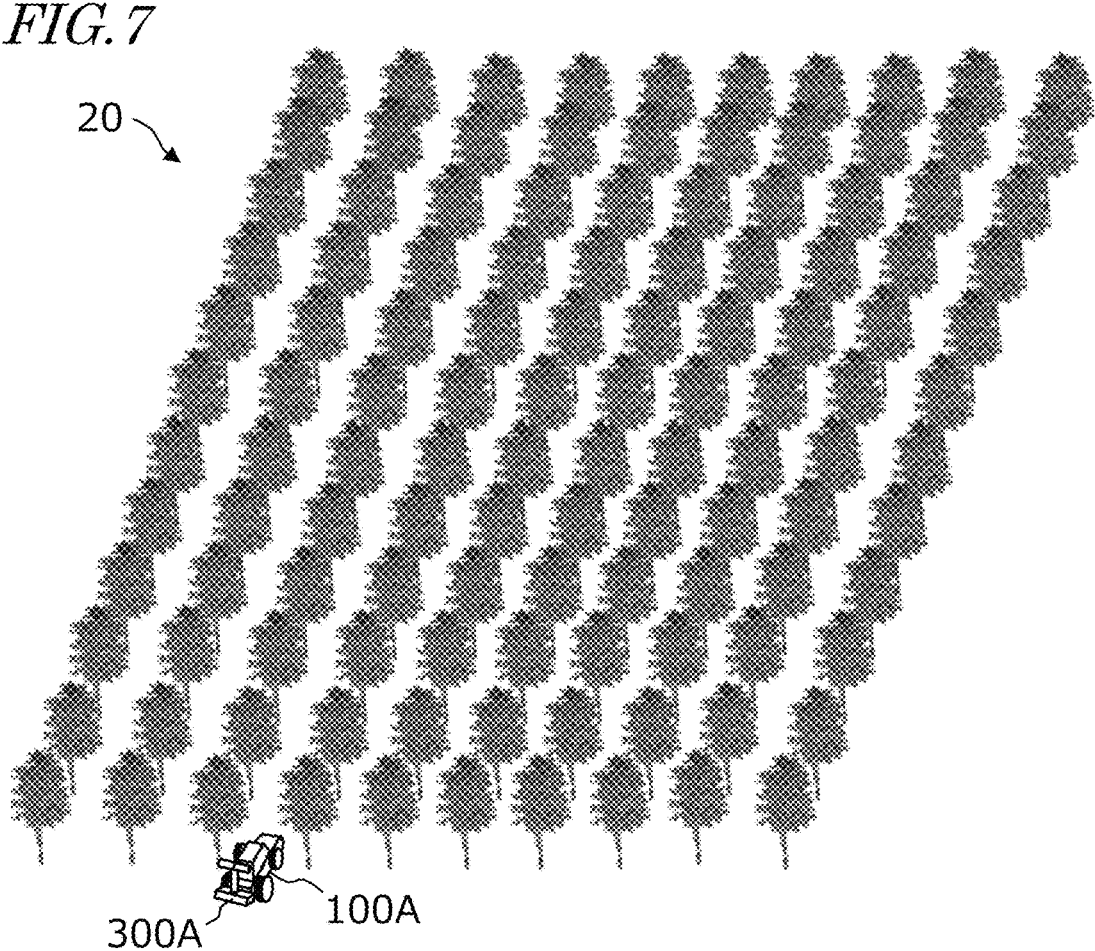
FIG. 7 is a diagram schematically showing an example of an environment to be traveled by the tractor.

FIG. 7 is a diagram schematically showing an example of an environment to be traveled by the tractor 100A. In this example, while traveling between multiple rows of trees 20 in a vineyard, the tractor 100A performs a predetermined task by using the implement 300A (e.g., mowing, preventive pest control, and so on). The sky over a vineyard is obstructed by leaves as well as branches and twigs, thus hindering self-driving using a GNSS. Therefore, in the present preferred embodiment, self-driving is performed by using the LiDAR sensor 110.

Through matching between sensor data that is repeatedly output from the LiDAR sensor 110 during travel of the tractor 100A and the environment map data, the ECU 160 estimates the position of the tractor 100A. For the matching, any arbitrary matching algorithm may be used, e.g., NDT (Normal Distribution Transform) or ICP (Iterative Closest Point). Matching allows the position and orientation of the LiDAR sensor 110 to be estimated. From the relative positions of the LiDAR sensor 110 and the tractor 100A, the position and orientation of the tractor 100A can also be estimated. Note that the orientation of the tractor 100A may be determined based on a signal that is output from the IMU 125.

In accordance with the position of the tractor 100A as estimated by the ECU 160, the ECU 180 for drive control purposes controls the movement of the tractor 100A. For example, when the position of the tractor 100A is deviated from a pre-designated intended travel path, the ECU 180 adjusts the steering of the tractor 100A, thus controlling it to come closer to the intended travel path. Such steering control may be performed based not only on the position of the tractor 100A but also on its orientation.

Figure 8:
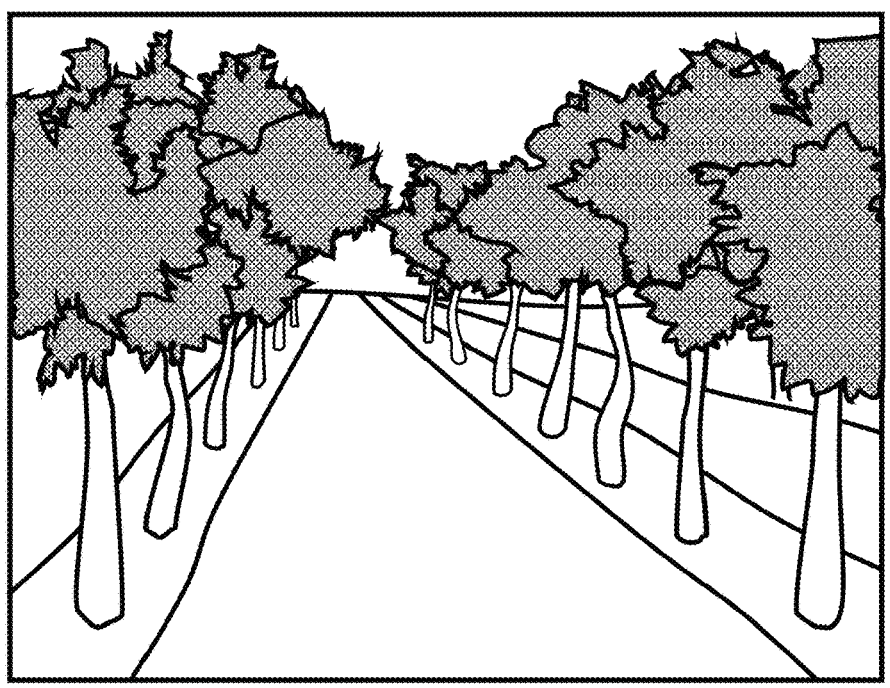
FIG. 8 is a perspective view schematically showing an example of a surrounding environment of the tractor.

FIG. 8 is a perspective view schematically showing an example of a surrounding environment of the tractor 100A. The tractor 100A travels between two adjacent rows of trees in the vineyard. While traveling, the tractor 100A scans the surrounding environment with a laser beam by using the LiDAR sensor 110. Thus, the tractor 100A acquires data indicating a distance distribution of objects that are present in the environment. The data indicating the distance distribution is converted into two-dimensional or three-dimensional group-of-points data, and recorded. Through matching between the group-of-points data and the environment map data, the position and attitude of the tractor 100A is estimated.

Figure 9A:
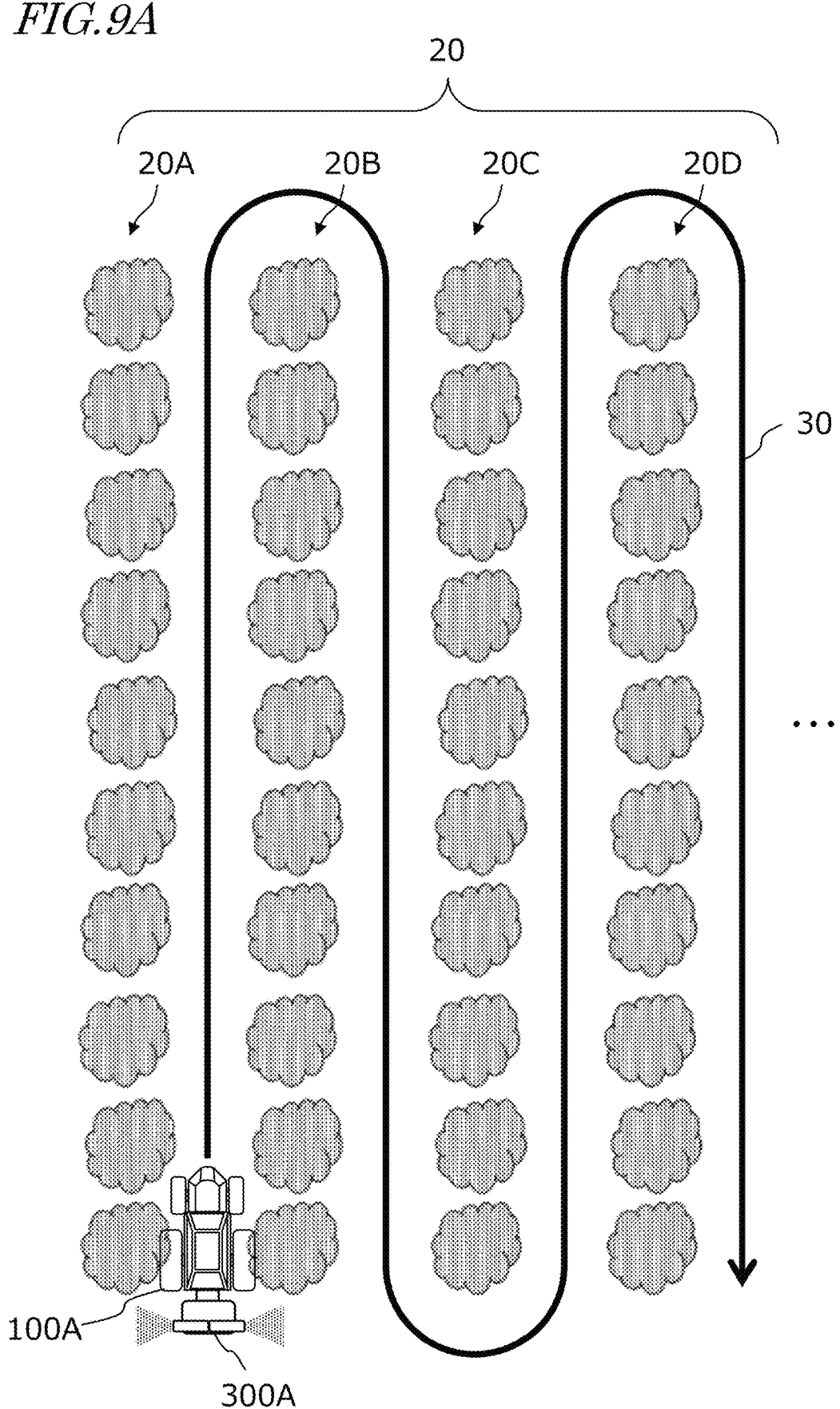
FIG. 9A is a diagram showing schematically showing an example of a travel path of the tractor.
Figure 9B:
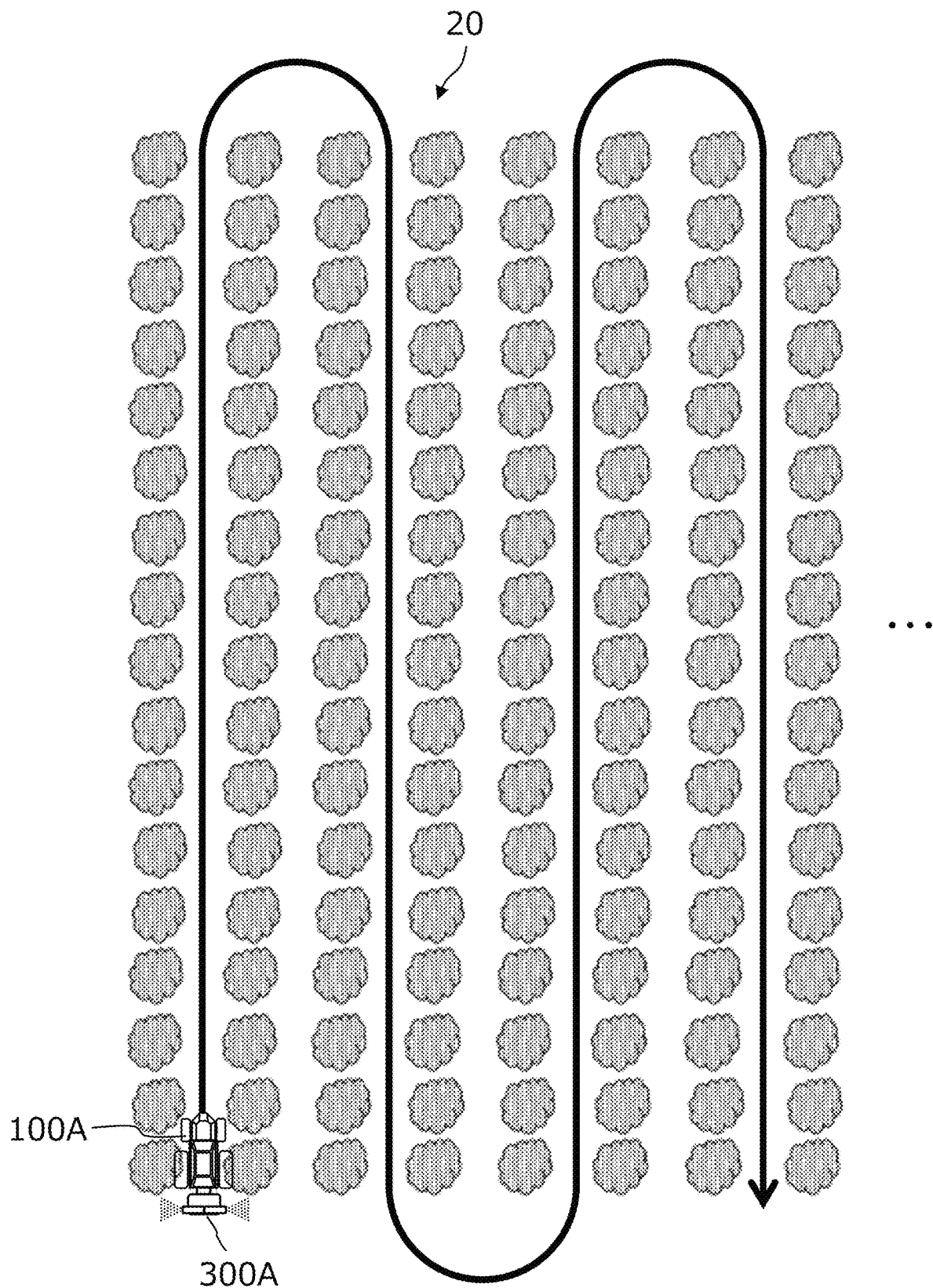
FIG. 9B is a diagram showing schematically showing another example of a travel path of the tractor.

FIG. 9A is a diagram showing schematically an example of a travel path of the tractor 100A during self-driving. The tractor 100A travels among multiple rows of trees 20 in the vineyard along a path 30 indicated by an arrow in FIG. 9A, for example. Although FIG. 9A illustrates any line segment included in the path 30 to be a straight line, the path along which the tractor 100A actually travels may include meandering portions. Now, the multiple rows of trees 20 are sequentially designated as a first row of trees 20A, a second row of trees 20B, a third row of trees 20C, a fourth row of trees 20D, ..., from the end. In the example of FIG. 9A, the tractor 100A first travels between the first row of trees 20A and the second row of trees 20B, and upon completing this travel, turns around to travel between the second row of trees 20B and the third row of trees 20C in the opposite direction. Once the travel between the second row of trees 20B and the third row of trees 20C is completed, it further turns to travel between the third row of trees 20C and the fourth row of trees 20D. Thereafter, by repeating a similar operation, it travels to the final end of the path 30, which will be in between the last two rows of trees. In the example shown in FIG. 9A, the implement 300A is a sprayer, which moves by being towed by the tractor 100A while spraying a chemical agent over the trees located on both sides of the path 30. In the case where the distance between adjacent rows of trees is short, as shown in FIG. 9B, it may travel so as to go along every other row. In this case, after the travel between the last two rows of trees is completed, an operation of traveling between untraveled rows of trees, so as to go along every other row, may be performed. Such travel is automatically performed as the tractor 100A conducts localization by using the LiDAR sensor 110. At timings when the GNSS unit 120 is able to receive a GNSS signal, positioning may be conducted based on the GNSS signal. For example, at any timing of turning around along the path 30 illustrated in either FIG. 9A or FIG. 9B, no leaves exist to obstruct the GNSS signal, and therefore positioning based on the GNSS signal is possible.

Next, with reference to FIGS. 10A to 10C, an example operation to be performed upon detecting a low pressure state, in which the tire pressure of a tire 104 is lower than the reference value, will be described.

Figure 10A:
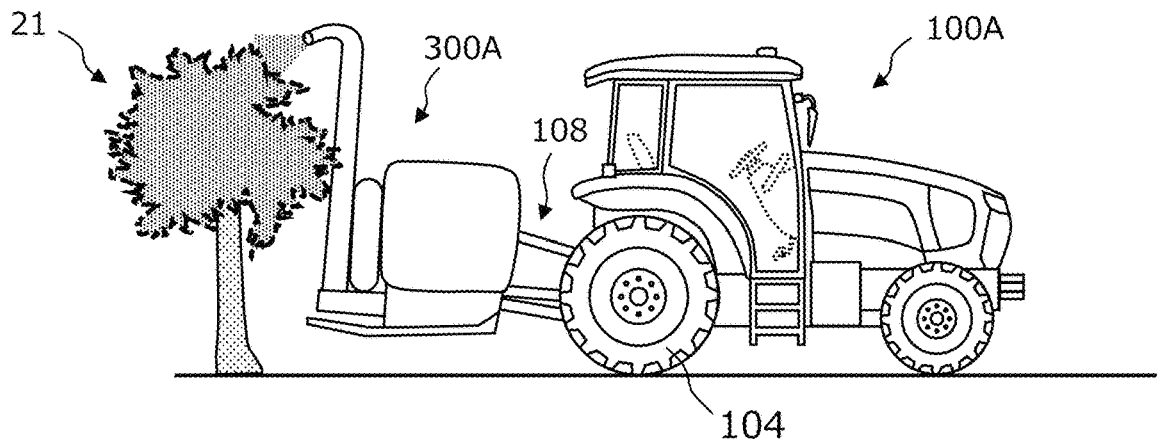
FIG. 10A is a first diagram for describing an operation of adjusting the attitude of the implement when a puncture occurs.

FIG. 10A shows a situation where the implement 300A is a sprayer, and the implement 300A is spraying a chemical agent over a tree 21 while the tractor 100A is traveling in a vineyard. In this example, the tire pressure of each tire 104 is in a normal range. In such a normal state, the nozzle of the implement 300A (i.e. the sprayer) is at a position where it is capable of appropriately spraying the chemical agent over the crop without colliding against the leaves or branches and twigs of the tree 21.

Figure 10B:
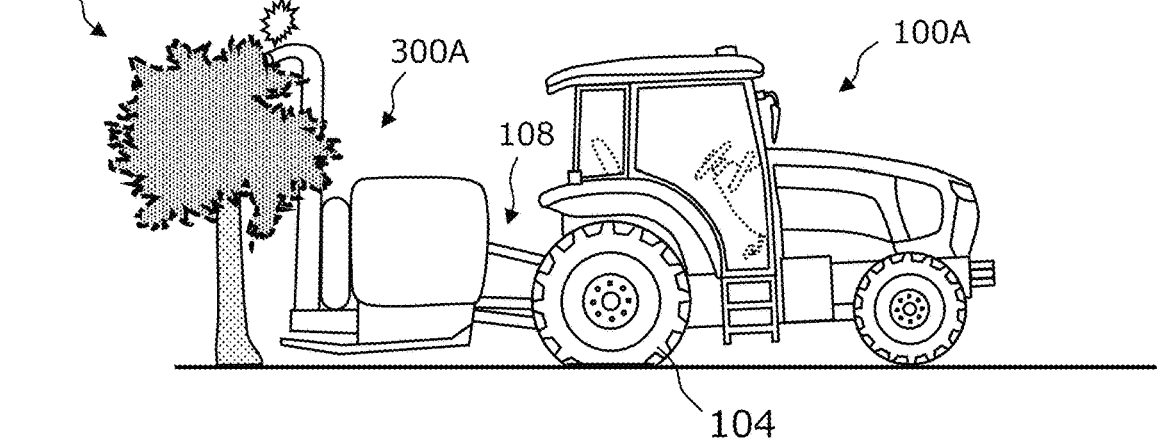
FIG. 10B is a second diagram for describing an operation of adjusting the attitude of the implement when a puncture occurs.

Now, as shown in FIG. 10B, a tire 104 (e.g., a right rear wheel in this example) may have a puncture. In this case, the tire will become flatter, thus causing a change in the attitude of the tractor 100A and/or the implement 300A. In this example, since a right tire 104 of the tractor 100A has a puncture, the tractor 100A and the implement 300A may lean toward the right. This may result in a problem in that the nozzle of the implement 300A may come into contact with the leaves or branches and twigs of the tree 21, or that the chemical agent may not be sprayed at appropriate positions of the crop, and so on.

Figure 10C:
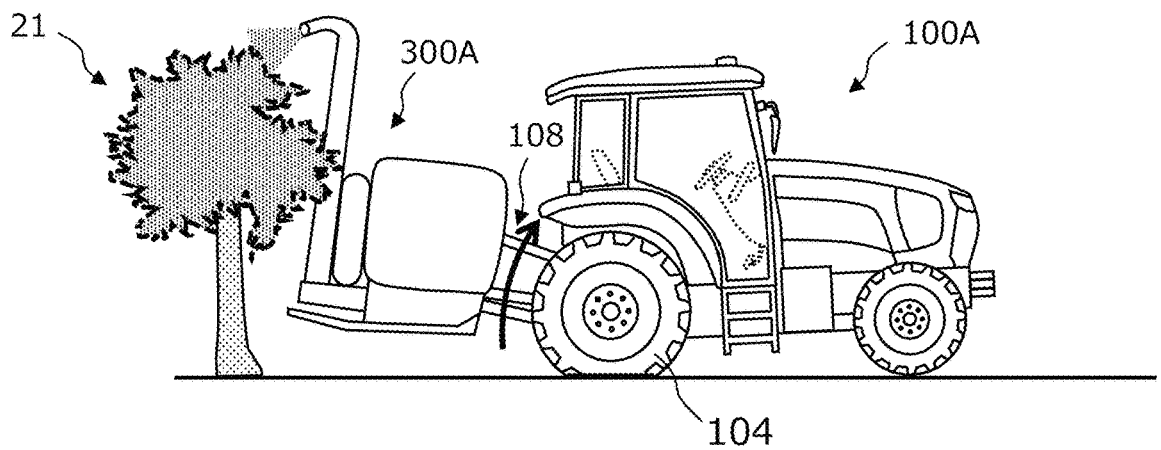
FIG. 10C is a third diagram for describing an operation of adjusting the attitude of the implement when a puncture occurs.

Therefore, as shown in FIG. 10C, when a puncture of the tire 104 is detected (i.e., when the tire pressure of the tire 104 is lower than a predetermined reference value), the ECU 180 raises the three-point hitch in the linkage device 108, thus adjusting the attitude of the implement 300A. As a result, the nozzle of the implement 300A can be prevented from colliding against the tree 21, whereby the chemical agent can be sprayed at appropriate positions of the crop. How much the linkage device 108 should be raised is to be determined in accordance with how much the attitude of the implement 300A will change when a puncture occurs. For example, the ECU 180 may drive the linkage device 108 so that the nozzle position will not significantly change before and after the puncture. A similar control may be performed when the tire pressure is evidently lower than in a normal state but not causing a puncture. The ECU 180 may determine the amount of raising the linkage device 108 in accordance with the measured or estimated value of tire pressure of the tire 104. In that case, a table or a mathematical function defining the correspondence between measured values or estimated values of tire pressure and amounts of raising the linkage device 108, or like data, may be prepared in advance and recorded in the storage device 150.

In the example shown in FIG. 10C, even if a low pressure state is detected, the travel of the tractor 100A and the task by the implement 300A is continued. Without being limited to such an example, when a low pressure state is detected, the ECU 180 may halt the implement 300A without any adjustment of the attitude of the implement 300A through driving the linkage device 108. Moreover, when a low pressure state is detected, travel of the tractor 100A may be halted or decelerated. When detecting that the tire 104 is in a low pressure state, the ECU 180 may transmit a signal to the server 500, in addition to performing the aforementioned control. The signal may contain positional information of the tractor 100A at that moment. As a result, the server 500 can record the position at which the problem of the tire 104 has occurred.

FIG. 11 is a diagram showing an example of the operation of and communications among the tractor 100A, the implement 300A, and the server 500. In this example, during self-driving of the tractor 100A, if the ECU 170 detects a low pressure state of a tire 104 (step S101), the ECU 180 raises the three-point hitch in the linkage device 108 (step S102). As a result, the position and attitude of the implement 300A change (step S301). The ECU 180 transmits a signal containing information indicating the position of the tractor 100A at that moment to the server 500 (step S103). Upon receiving this signal, the server 500 records the position of the tractor 100A being indicated by the signal to the storage device 550 (step S501).

Figure 12:
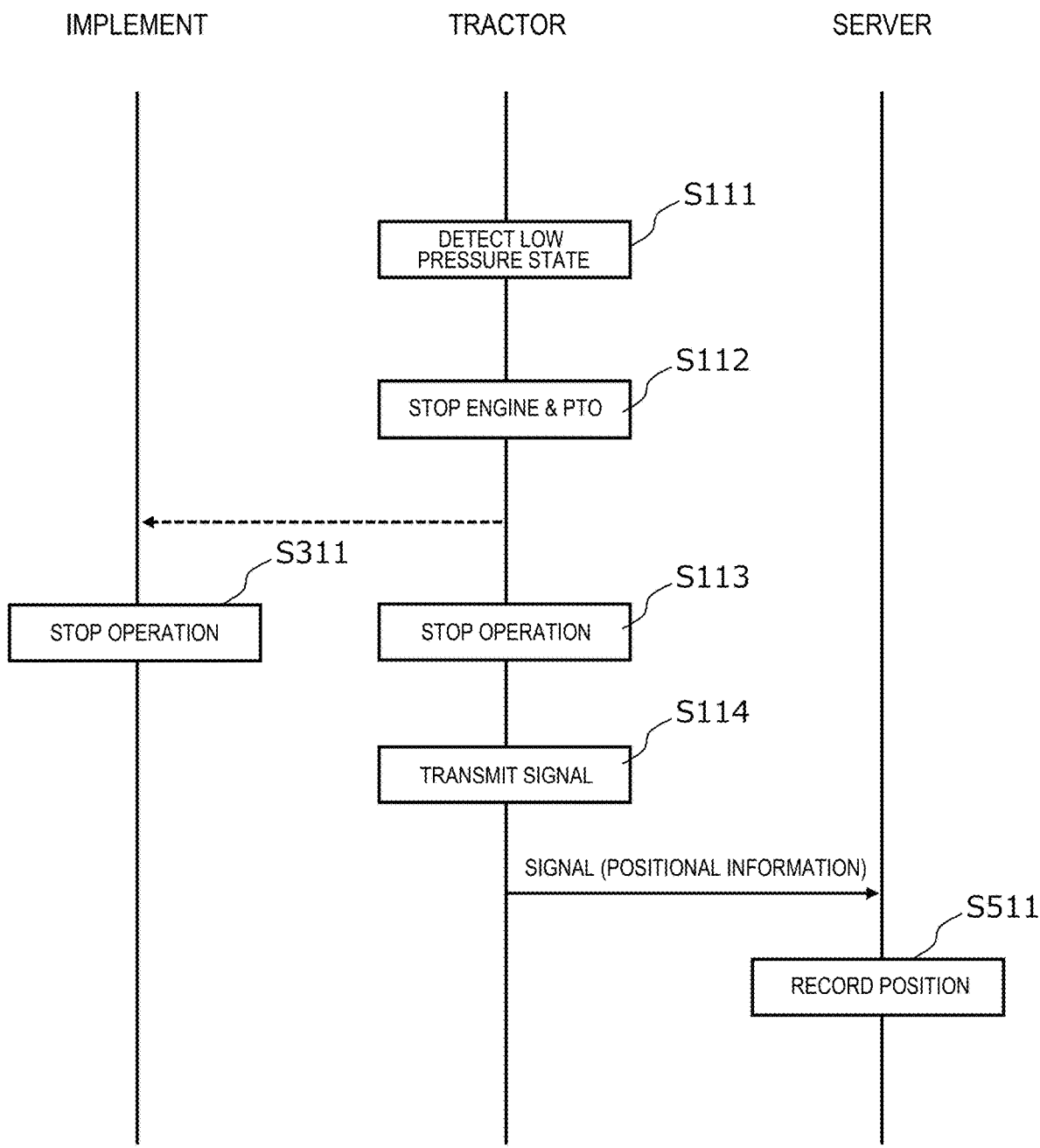
FIG. 12 is a diagram showing another example of the operation of and communications among a tractor, an implement, and a server.

FIG. 12 is a diagram showing another example of the operation of and communications among the tractor 100A, the implement 300A, and the server 500. In this example, during self-driving of the tractor 100A, if the ECU 170 detects a low pressure state of a tire 104 (step S111), the ECU 180 stops the engine and the PTO of the tractor 100A (step S112). As a result, the operation of the tractor 100A and the implement 300A stops (step S113, S311). The ECU 180 transmits a signal containing information indicating the position of the tractor 100A at that moment to the server 500 (step S114). Upon receiving this signal, the processing device 560 of the server 500 records the position of the tractor 100A being indicated by the signal to the storage device 550 (step S511).

In the examples of FIG. 11 and FIG. 12, in addition to receiving the signal and recording the position of the tractor 100A, the processing device 560 of the server 500 may send an alert to an information terminal being used by the user. Such an alert may be sent by the ECU 180 in the tractor 100A. The user of the information terminal having received the alert can confirm the position of the tractor 100A at which the tire pressure of a tire 104 became lower, and take necessary measures, e.g., going to the site.

Figure 13:
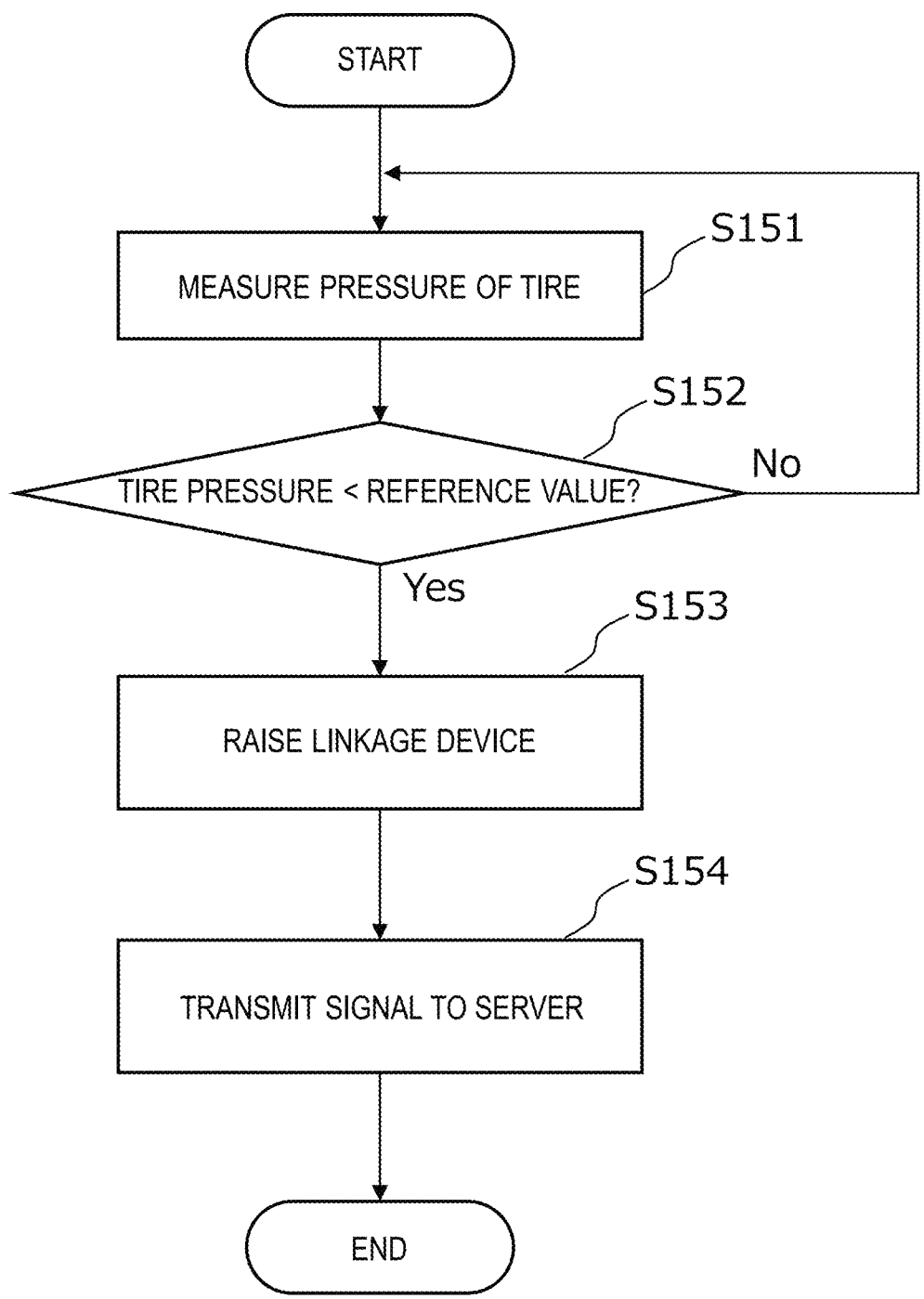
FIG. 13 is a flowchart showing an operation of the tractor in the example shown in FIG. 11.

FIG. 13 is a flowchart showing the operation of the tractor 100A in the example illustrated in FIG. 11. In this example, during self-driving of the tractor 100A, the pressure sensor 135 measures the pressure of each tire of the wheels 104 (step S151). Next, the ECU 170 determines whether the measured value of pressure is lower than the reference value or not (step S152). Herein, instead of a pressure that was immediately previously measured, a mean value of pressures that were measured during a certain period of time in the past (e.g., 1 minute, 10 minutes, 1 hour, or 1 day) may be treated as the measured value of pressure. The reference value may be a low value corresponding to a puncture state, or a relatively high value corresponding to a non-puncture state. If the measured value of pressure is not lower than the reference value, control returns to step S151, and the same operation is repeated. If the measured value of pressure is lower than the reference value, the ECU 180 raises the three-point hitch in the linkage device 108 (step S153). As a result, the attitude of the implement 300A changes. Next, the ECU 180 transmits a signal to the server 500 (step S154). This signal contains information indicating the position of the tractor 100A as immediately previously estimated by the ECU 160. Upon receiving this signal, the server 500 records the position of the tractor 100A being indicated by the signal (step S154).

Figure 14:
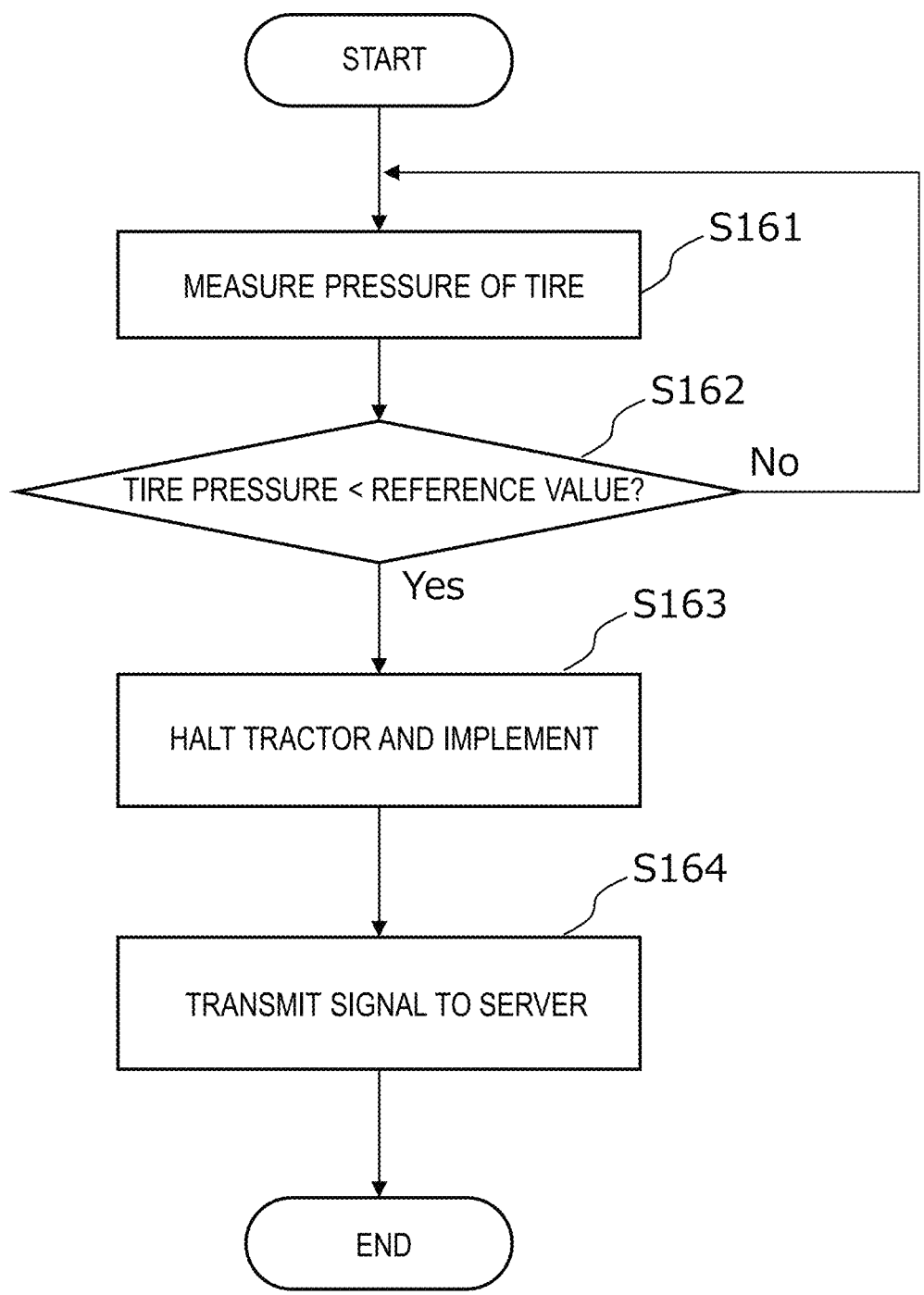
FIG. 14 is a flowchart showing an operation of the tractor in the example shown in FIG. 12.

FIG. 14 is a flowchart showing the operation of the tractor 100A in the example illustrated in FIG. 12. In this example, too, during self-driving of the tractor 100A, the pressure sensor 135 measures the tire pressure of each tire 104 (step S161). Next, the ECU 170 determines whether the measured value of pressure is lower than the reference value or not (step S162). The operation of steps S161 and S162, respectively, is identical to the operation of steps S151 and S152 shown in FIG. 13. When the measured value of pressure is lower than the reference value, the ECU 180 halts the tractor 100A and the implement 300A by stopping the engine and the PTO of the tractor 100A (step S163). Next, the ECU 180 transmits a signal containing positional information to the server 500 (step S164). Upon receiving this signal, the server 500 records the position of the tractor 100A being indicated by the signal.

FIG. 15 is a flowchart showing another example of the operation of the tractor 100A. In this example, two levels of low pressure states of pressure of a tire are detected against two reference values. In this example, too, during self-driving of the tractor 100A, the pressure sensor 135 measures the tire pressure of each tire 104 (step S171). Next, the ECU 170 determines whether the measured value of pressure is lower than a first reference value or not (step S172). If the measured value of pressure is not lower than the first reference value, control returns to step S171, and a similar operation is repeated. If the measured value of pressure is lower than the first reference value, the ECU 170 determines whether or not the measured value of pressure is lower than a second reference value which is smaller than the first reference value (step S173). The first reference value may correspond to a pressure state which is low but not causing a puncture, for example, and the second reference value may correspond to a puncture state, for example. If the measured value of pressure is not lower than the second reference value, the ECU 180 drives the linkage device 108 to adjust the attitude of the implement 300A, and the ECU 180 transmits a signal to the server 500 (step S174). After step S174, control returns to step S171, and a similar operation is repeated. If the measured value of pressure is lower than the second reference value, the ECU 180 stops the engine and the PTO of the tractor 100A to halt the tractor 100A and the implement 300A (step S175). At this time, the ECU 170 transmits a signal containing positional information of the tractor 100A at that moment to the server 500 (step S175).

FIG. 16 is a diagram showing an example of the signal or data transmitted from the ECU 180 to the server 500. In this example, the transmitted data may include a tractor ID which is an identification number of the tractor 100A, an implement ID which is an identification number of the implement 300A, the position of the tractor 100A (an x coordinate and a y coordinate), a measured value or an estimated value of pressure of the tire 104, and information indicating the presence or absence of a puncture. The presence or absence of a puncture is determined based on whether a measured value or an estimated value of pressure is lower than a specific reference value that is associated with a puncture state or not. If the measured value or estimated value of pressure is lower than the reference value, the ECU 170 determines that a puncture has occurred. Information indicating not only the presence or absence of a puncture but also any other low pressure state may be contained in the transmitted data. Other than the information shown in FIG. 16, the transmitted data may also include header information representing a data format, an address, etc. Note that the transmitted data is not limited to the data illustrated in FIG. 16. The information indicated in each item of the data illustrated in FIG. 16 is to be transmitted as necessary. For example, information concerning the presence or absence of a puncture may be transmitted in the case where the server 500 manages occurrences of punctures of the tires 104 of the tractor 100A. In the case where the server 500 does not manage occurrences of punctures, or in the case where the processing device 560 of the server 500 determines the presence or absence of a puncture on the basis of the information of pressure of each tire as received from the tractor 100A, the information indicating the presence or absence of a puncture does not need to be transmitted from the ECU 180 to the server 500.

In the examples shown in FIG. 13 to FIG. 15, the tire pressure of a tire 104 is measured by using the pressure sensor 135. However, as mentioned earlier, the tire pressure of a tire 104 may be estimated without using the pressure sensor 135. For example, the ECU 170 may estimate the tire pressure of a tire 104 based on a difference between a theoretical vehicle velocity that is calculated from the rotational speed of the wheel axis as measured by the rotation sensor 127 and the circumference of the tire 104 in a normal state, and a LiDAR vehicle velocity calculated from temporal change of the position of the tractor 100A as estimated by the ECU 160 based on sensor data that is output from the LiDAR sensor 110. Alternatively, the ECU 170 may estimate the tire pressure of a tire 104 based on a difference between the aforementioned theoretical vehicle velocity and a GNSS vehicle velocity that is calculated from temporal change of the position as indicated by a signal received by the GNSS unit 120. A correlation exists between the tire pressure of the tire 104 and a difference between the theoretical vehicle velocity and the LiDAR vehicle velocity, or a difference between the theoretical vehicle velocity and the GNSS vehicle velocity. Data representing this correlation may be recorded in the storage device 150 in the form of a table or a mathematical function, for example. Based on this correlation, the ECU 170 can estimate the tire pressure of the tire 104 from a difference between the theoretical vehicle velocity and the LiDAR vehicle velocity, or from a difference between the theoretical vehicle velocity and the GNSS vehicle velocity.

Through the above operation, when the tire pressure of at least one tire 104 becomes significantly lower while the tractor 100A is self-driving, such a state can be detected, and at least one of the tractor 100A and the implement 300A can be caused to perform a necessary operation. This makes it possible to avoid undesirable situations, such as the implement 300A colliding against the crop, or an inappropriate task being performed, for example.

Note that the above operation is similarly applicable to the case where the ECU 170 detects a high pressure state of a tire 104. In this case, however, the adjustment of the position and attitude of the implement 300A when detecting a high pressure state is made by lowering the three-point hitch of the linkage device 108, rather than raising it. The ECU 170 may detect both a low pressure state and a high pressure state of a tire 104, or detect only one of a low pressure state and a high pressure state of a tire 104 (e.g., only a low pressure state).

Next, an example control to be performed during automatic steering by the ECU 180, which is directed to drive control purposes, will be described.

Figure 17:
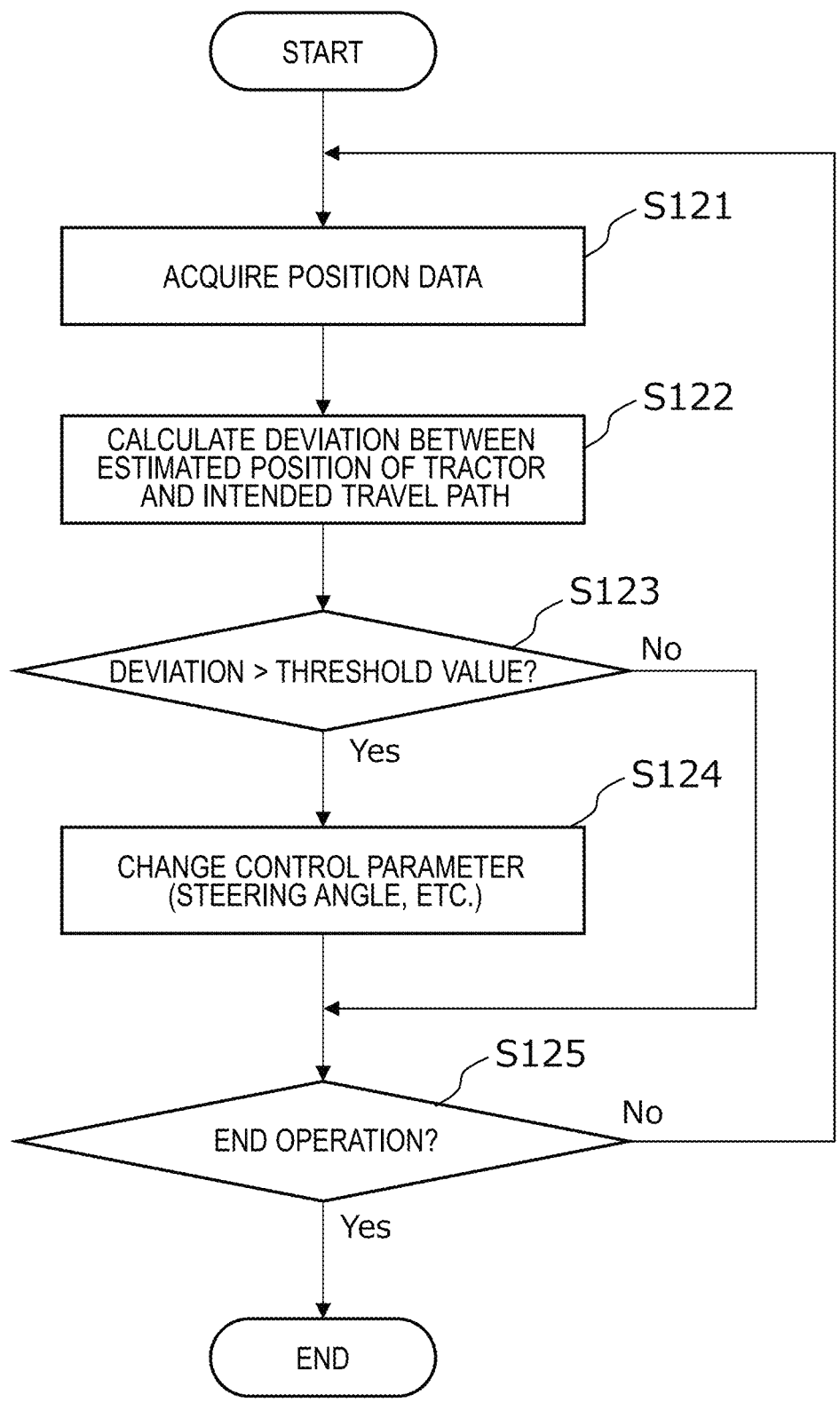
FIG. 17 is a flowchart showing an example operation during automatic steering.

FIG. 17 is a flowchart showing an example operation during automatic steering, which is performed by the ECU 180. During travel of the tractor 100A, the ECU 180 performs automatic steering by performing the operation from step S121 to S125 shown in FIG. 17. First, the ECU 180 acquires data representing the position of the tractor 100A as estimated by the ECU 160 (step S121). Next, the ECU 180 calculates a deviation between the estimated position of the tractor 100A and a previously-determined intended travel path (step S122). The deviation represents a distance between the estimated position of the tractor 100A and the intended travel path at that point in time. The ECU 180 determines whether the calculated deviation in position exceeds a pre-designated threshold value or not (step S123). If the deviation exceeds the threshold value, the ECU 180 changes a control parameter (e.g., steering angle) of the steering device included in the drive device 140 so as to reduce the deviation. Herein, not only the steering angle but also the velocity may be changed. At step S123, if the deviation does not exceed the threshold value, the operation of step S124 is omitted. At the next step S125, the ECU 180 determines whether a command to end operation has been received or not. The command to end operation may be given when the user uses the operational terminal 200 to instruct that the self-driving mode be stopped, or when the tractor 100A has arrived at a destination, for example. If the command to end operation has not been issued, control returns to step S121, and a similar operation is performed based on a newly-estimated position of the tractor 100A. Until the command to end operation is given, the ECU 180 repeats the operation from steps S121 to S125.

In the example shown in FIG. 17, the ECU 180 is illustrated as controlling the drive device 140 based only on a deviation between the estimated position of the tractor 100A and the intended travel path. However, a deviation in terms of directions may further be considered in the control. For example, when a directional deviation exceeds a pre-designated threshold value, where the directional deviation is an angle difference between the orientation of the tractor 100A as estimated by the ECU 160 and the direction of the intended travel path, the ECU 180 may change the control parameter (e.g., steering angle) of the steering device of the drive device 140 in accordance with the deviation.

Hereinafter, with reference to FIGS. 18A to 18D, an example of steering control by the ECU 180 will be described more specifically.

Figure 18A:
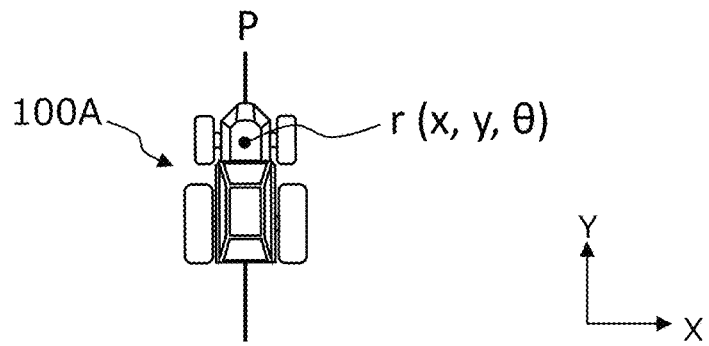
FIG. 18A is a first diagram for describing an example of steering control.
Figure 18B:
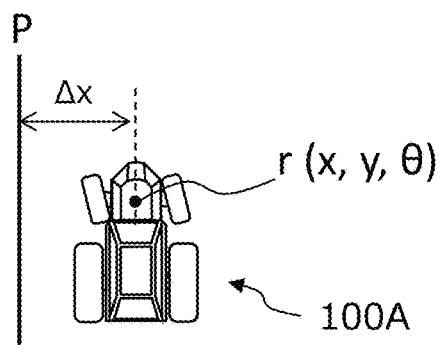
FIG. 18B is a second diagram for describing an example of steering control.
Figure 18C:
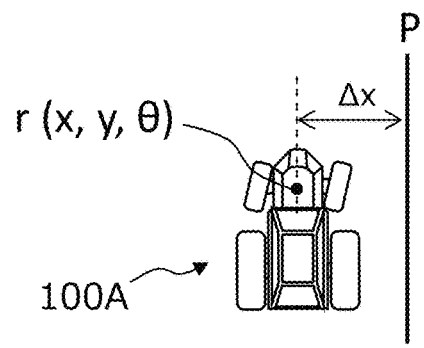
FIG. 18C is a third diagram for describing an example of steering control.
Figure 18D:
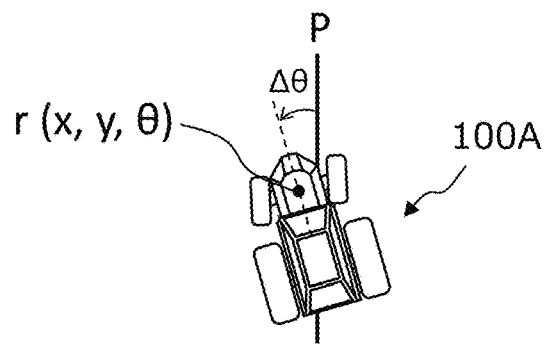
FIG. 18D is a fourth diagram for describing an example of steering control.

FIG. 18A is a diagram showing an example of a tractor 100A that travels along an intended travel path P. FIG. 18B is a diagram showing an example of a tractor 100A at a position which is shifted rightward from the intended travel path P. FIG. 18C is a diagram showing an example of a tractor 100A at a position which is shifted leftward from the intended travel path P. FIG. 18D is a diagram showing an example of a tractor 100A which is oriented in an inclined direction with respect to the intended travel path P. In these figures, the pose, i.e., the position and orientation, of the tractor 100A as estimated by the ECU 160 is expressed as r(x,y,θ). Herein, (x,y) are coordinates representing an estimated position of a reference point on the tractor 100A, in an XY coordinate system which is a two-dimensional coordinate system being fixed to the globe. In the examples shown in FIGS. 18A to 18D, the reference point on the tractor 100A is at the body front, but the reference point may be at any arbitrary position. θ is an angle representing the estimated orientation of the tractor 100A. Although the intended travel path P is shown parallel to the Y axis in the examples illustrated in these figures, generally speaking, the intended travel path P may not necessarily be parallel to the Y axis.

As shown in FIG. 18A, in the case where the position and orientation of the tractor 100A are not deviated from the intended travel path P, the ECU 180 maintains the steering angle and velocity of the tractor 100A without changing them.

As shown in FIG. 18B, when the position of the tractor 100A is shifted rightward from the intended travel path P, the ECU 180 changes the steering angle by changing the angle of rotation of the steering wheel included in the drive device 140 so that the traveling direction of the tractor 100A will be inclined leftward, thus bringing the tractor 100A closer to the path P. Herein, not only the steering angle but also the velocity may be changed. The magnitude of the steering angle may be adjusted in accordance with the magnitude of a positional deviation Δx, for example.

As shown in FIG. 18C, when the position of the tractor 100A is shifted leftward from the intended travel path P, the ECU 180 changes the steering angle by changing the angle of rotation of the steering wheel so that the traveling direction of the tractor 100A will be inclined rightward, thus bringing the tractor 100A closer to the path P. In this case, too, not only the steering angle but also the velocity may be changed. The amount of change of the steering angle may be adjusted in accordance with the magnitude of the positional deviation Δx, for example.

As shown in FIG. 18D, in the case where the position of the tractor 100A is not considerably deviated from the intended travel path P but its orientation is nonetheless different from the direction of the intended travel path P, the ECU 180 changes the steering angle so that the directional deviation Δ will become smaller. In this case, too, not only the steering angle but also the velocity may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the tractor 100A to return to the path P, so that the directional deviation Δ will inevitably have a large absolute value. Conversely, when the positional deviation Δx has a small absolute value, the directional deviation Δ needs to become closer to zero. Therefore, it may be advantageous to introduce a relatively large weight (i.e., control gain) for the directional deviation Δ in determining the steering angle.

For the steering control and velocity control of the tractor 100A, control techniques such as PID control or MPC (Model Predictive Control) may be applied. Applying these control techniques will make for smoothness of the control of bringing the tractor 100A closer to the intended travel path P.

Note that, when an obstacle is detected by one or more obstacle sensors 130 during travel, the ECU 180 controls the drive device 140 so as to avoid the obstacle. If the obstacle cannot be avoided, the ECU 180 halts the tractor 100A. Note that, regardless of whether the obstacle is avoidable or not, the ECU 180 may halt the tractor 100A whenever an obstacle is detected.

Next, an example control where the control gain for determining the steering angle is changed in accordance with the tire pressure will be described.

The ECU 180 can determine the steering angle in automatic steering based on the positional deviation Δx and a pre-designated control gain G1. For example, a value obtained by multiplying the positional deviation Δx by the control gain G1 may be defined as the steering angle. Alternatively, the ECU 180 may determine the steering angle in automatic steering based on the directional deviation Δθ and a pre-designated control gain G2. For example, the ECU 180 may determine the steering angle to be a sum (G1Δx+G2Δθ) of: a multiplication product between the directional deviation Δθ and the control gain G2 or a multiplication product between the positional deviation Δx and the control gain G1; and a multiplication product between the directional deviation Δθ and the control gain G2. The ECU 180 may change the control gains G1 and G2 in accordance with the detected tire pressure.

Figure 19A:
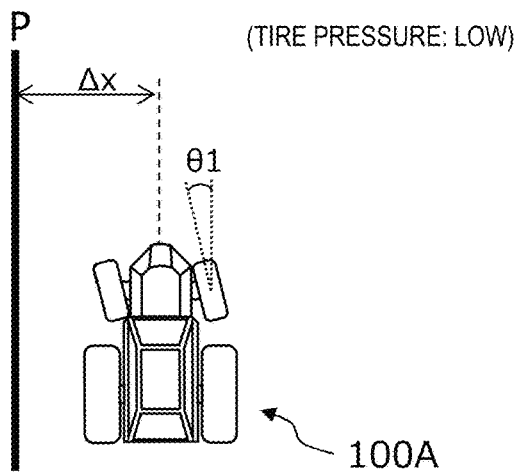
FIG. 19A is a diagram showing an example of a steering angle θ1 in a low pressure state in which the pressure of at least one tire is lower than the reference range.
Figure 19B:
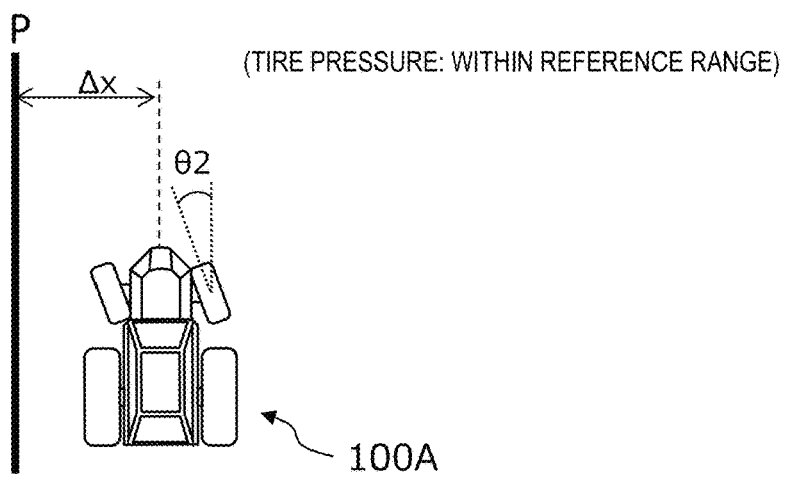
FIG. 19B is a diagram showing an example of a steering angle θ2 in a state where the pressures of all tires are within the reference range.
Figure 19C:
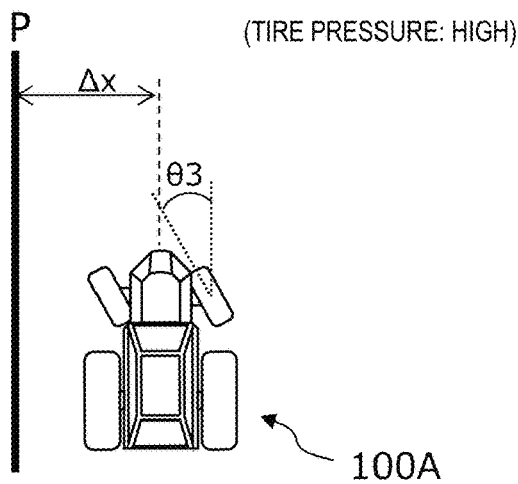
FIG. 19C is a diagram showing an example of a steering angle θ2 in a high pressure state in which the pressure of at least one tire is higher than the reference range.

FIG. 19A is a diagram showing an example of a steering angle θ1 in a low pressure state, in which the pressure of at least one tire of the tractor 100A is lower than the reference range. FIG. 19B is a diagram showing an example of a steering angle θ2 in a state where the pressures of all tires of the tractor 100A are within the reference range. FIG. 19C is a diagram showing an example of a steering angle θ3 in a high pressure state, in which the pressure of at least one tire of the tractor 100A is higher than the reference range. In each of these examples, a positional deviation Δx of the same magnitude exists. For simplicity, it is assumed that the steering angle is determined from a multiplication product between the positional deviation Δx and the control gain G1.

In the example shown in FIG. 19A, the ECU 180 sets the control gain G1 to a value which is lower than that in the example shown in FIG. 19B. As a result, while the positional deviation Δθ will be the same, the steering angle θ1 in the example of FIG. 19A will be smaller than the steering angle θ2 in the example of FIG. 19B. On the other hand, in the example shown in FIG. 19C, the ECU 180 sets the control gain G1 to a value which is higher than that in the example shown in FIG. 19B. As a result, while the positional deviation Δθ will be the same, the steering angle θ3 in the example of FIG. 19C will be larger than the steering angle θ2 in the example of FIG. 19B.

Not only in the case where the tractor 100A travels along a linear intended travel path, but also in the case where the tractor 100A travels along a curved intended travel path or the tractor 100A makes a turning operation, the aforementioned control is similarly applicable. The tractor 100A makes a turning operation when arriving at a pre-designated point in the field (e.g., an end of a path between rows of trees, a headland, or the like), or when the user has instructed the tractor 100A to turn. The turning operation may be automatically performed in accordance with an operation pattern concerning a plurality of pre-designated items which have previously been set by the user, for example. The plurality of items may include items such as raising/lowering the three-point linkage, turning ON/OFF the PTO rotation, turning ON/OFF the locking differential, turning ON/OFF the 4WD mode, and increasing/decreasing the engine revolutions, for example. The tractor 100A performs a pre-designated operation for any such item, and automatically turns. The tractor 100A may adjust the control gain for determining the steering angle in a turning operation in accordance with the tire pressure of a tire. Through such adjustments, even when the tire pressure of a tire is deviated from the reference range, it is still possible to make a turn as expected.

Figure 20:
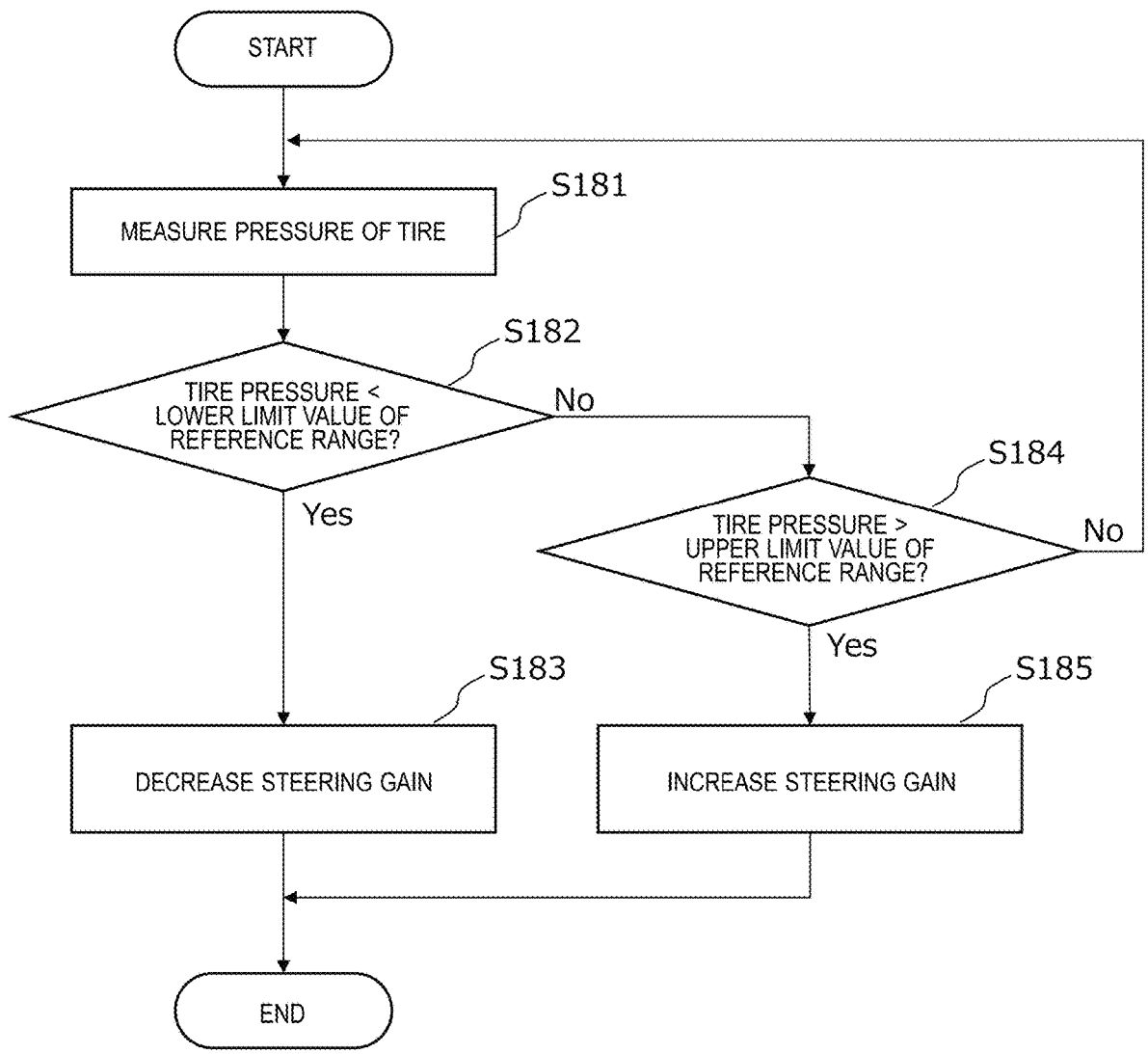
FIG. 20 is a flowchart showing an example operation of adjusting a control gain for determining the steering angle in accordance with a pressure of a tire.

FIG. 20 is a flowchart showing an example operation where the control gain for determining the steering angle (i.e., steering gain) is adjusted in accordance with the pressure of a tire. In this example, during self-driving of the tractor 100A, the pressure sensor 135 measures the tire pressure of each tire 104 (step S181). Next, the ECU 170 determines whether the measured value of tire pressure of at least one tire 104 is lower than the lower limit value of a pre-designated reference range or not (step S182). If the measured value of tire pressure of at least one tire 104 is lower than the lower limit value, the ECU 180 decreases the steering gain (step S183). How much the steering gain should be decreased may be adjusted depending on which tire 104 is in a low pressure state, and in accordance with the measured value of the tire pressure. If the measured value of tire pressure of all tires 104 are equal to or greater than the lower limit value, the ECU 170 determines whether the measured value of tire pressure of at least one tire 104 exceeds the upper limit value of the reference range or not (step S184). If the measured value of tire pressure of at least one tire 104 is higher than the upper limit value, the ECU 180 increases the steering gain (step S185). How much the steering gain is increased may be adjusted depending on which tire 104 is in a high pressure state, and in accordance with the measured value of the tire pressure.

Thus, in the present preferred embodiment, when it is detected that at least one tire 104 is in a low pressure state or a high pressure state, the ECU 180 changes the steering gain. More specifically, when the tire pressure is lower than the reference range, the ECU 180 decreases the steering gain, and when the tire pressure is higher than the reference range, the ECU 180 increases the steering gain. In a low pressure state, the tire will have an increased grip, and therefore it is easier to turn given the same steering angle. Conversely, in a high pressure state, the tire have a poorer grip, and therefore it is more difficult to turn given the same steering angle. In the present preferred embodiment, by adjusting the steering gain in accordance with tire pressure, it is possible to realize substantially identical running properties regardless of the tire pressure.

In the development phase of automatic steering, adjustments of the steering gain are typically performed in a standard pressure state in which the tire pressure is within the reference range. As a result, when the tire pressure changes from the standard pressure state during travel, or when the user has changed the tire pressure in accordance with the content of the task, it may not be possible to obtain expected running properties. In such a case, the user is able to adjust the steering gain by manipulating an operational terminal such as a virtual terminal (VT) provided in the work vehicle 100. However, the work vehicle 100 needs to do several trial runs for making adjustments. Introducing the control of automatically adjusting the steering gain in accordance with the tire pressure as described above saves the user the trouble of adjusting the steering gain.

In the example shown in FIG. 20, the case where a tire 104 is in a low pressure state and the case where a tire 104 is in a high pressure state are both to be detected, and the steering gain is adjusted in accordance with such states. Without being limited to such an operation, only one of a low pressure state and a high pressure state may be detected, and only one of a decrease or an increase in the steering gain may be made, for example.

Next, an example operation where the timings of switching ON/OFF the locking differential and switching between 2WD/4WD are changed in accordance with the tire pressure will be described.

Figure 21:
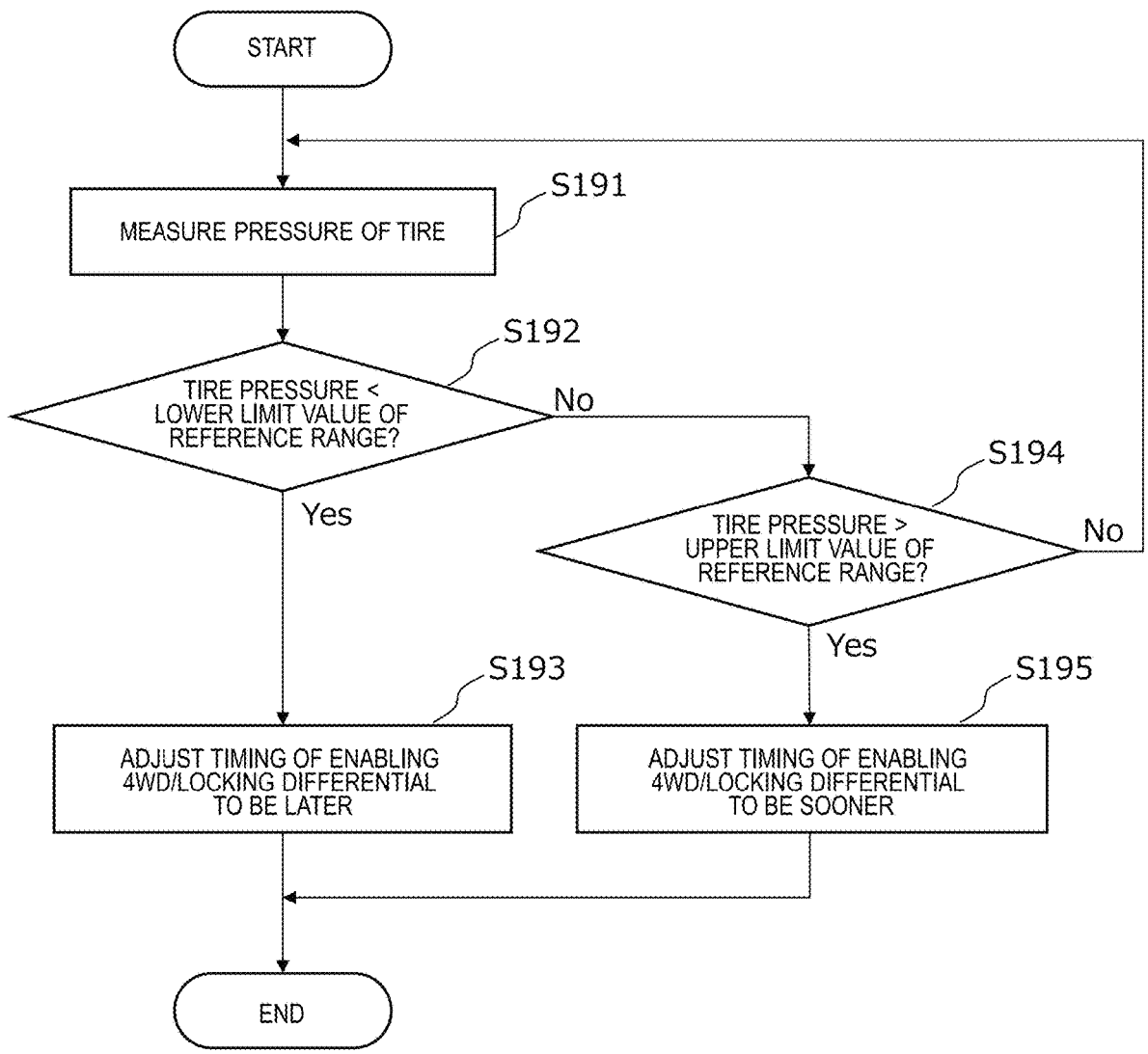
FIG. 21 is a flowchart showing an example operation of adjusting the timings of enabling the locking differential and switching from the 2WD mode to the 4WD mode in accordance with the tire pressure.

FIG. 21 is a flowchart showing an example operation where the timings of enabling the locking differential and switching from the 2WD mode to the 4WD mode are adjusted in accordance with the tire pressure. In this example, during self-driving of the tractor 100A, the pressure sensor 135 measures the pressure of each tire (step S191). Next, the ECU 170 determines whether the measured value of pressure is lower than the lower limit value of a pre-designated reference range or not (step S192). If the measured value of tire pressure of at least one tire 104 is lower than the lower limit value, the ECU 180 adjusts the timings of enabling 4WD and the locking differential so as to be later (step S193). For example, the ECU 180 may increase the length of time until 4WD and the locking differential are actually enabled after the condition for enabling 4WD and the locking differential is satisfied, by a predetermined period of time (e.g., about several hundred milliseconds to several seconds). How much longer the time to lapse until these functions are actually enabled should be may be adjusted depending on which tire 104 is in a low pressure state, and in accordance with the measured value of tire pressure. If the measured values of pressure of all tires 104 are equal to or greater than the lower limit value, the ECU 170 determines whether the measured value of tire pressure of at least one tire 104 exceeds the upper limit value of the reference range (step S194). If the measured value of pressure is higher than the upper limit value, the ECU 180 adjusts the timings of enabling 4WD and the locking differential so as to be sooner (step S195). For example, the ECU 180 may decrease the length of time until 4WD and the locking differential are actually enabled after the condition for enabling 4WD and the locking differential is satisfied, by a predetermined period of time (e.g., about several hundred milliseconds to several seconds). How much shorter the time to lapse until these functions are actually enabled may be adjusted depending on which tire 104 is in a high pressure state, and in accordance with the measured value of tire pressure. Note that the ECU 180 may change the length of time until these functions are enabled by changing the condition for enabling 4WD and the locking differential.

In the development phase of slip prevention control, adjustments of the timing of switching between 2WD and 4WD and the control timing for locking differential are typically made in a standard pressure state, in which the tire pressure is within the reference range. Therefore, if the tire pressure changes from the standard pressure state, an expected level of grip may not be obtained. For example, if the tire pressure is higher than the reference range, a greater slip than expected will occur, which may result in a slower return to the path. Conversely, if the tire pressure is lower than the reference range, a deviation from the path may occur due to the increased grip. By changing the timing of enabling the locking differential and the timing of enabling 4WD in accordance with the detected tire pressure as in the above example, slips and deviations from the intended travel path can be easier to avoid.

In the example shown in FIG. 21, the control timings of 4WD and the locking differential are both adjusted in accordance with the tire pressure. However, only one of the control timings of 4WD and the locking differential may be adjusted in accordance with the tire pressure. Moreover, only one of a low pressure state and a high pressure state may be detected, and the timing of enabling 4WD or the locking differential may be changed in accordance with the detected tire pressure.

Preferred Embodiment 2

Next, a second preferred embodiment of the present disclosure will be described.

Figure 22:
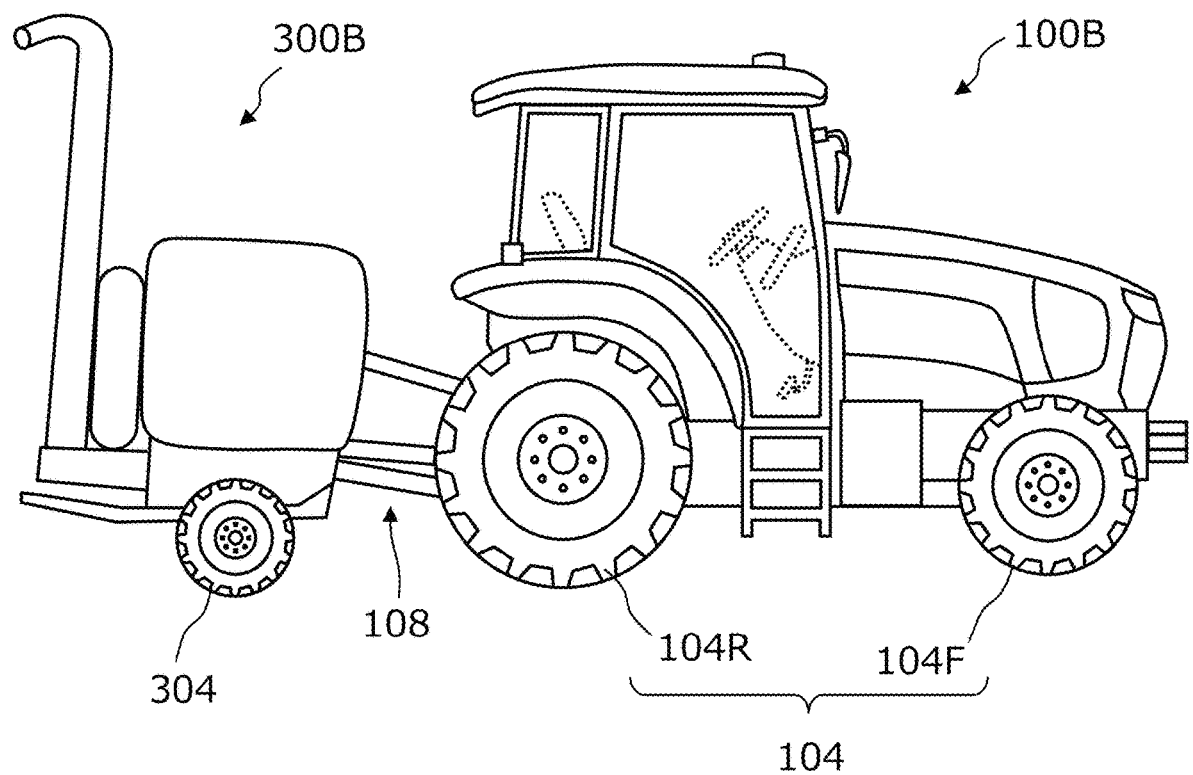
FIG. 22 is a side view schematically showing a tractor and an implement according to a second preferred embodiment of the present disclosure.

FIG. 22 is a side view schematically showing a tractor 100B and an implement 300B according to the present preferred embodiment. In the present preferred embodiment, it is not the tractor 100B but the implement 300B that performs detection and control similar to those by the tractor 100A of Preferred Embodiment 1. The implement 300B in the present preferred embodiment includes a plurality of tires 304, and is able to detect the tire pressure of each tire 304. Upon detecting that the tire pressure of at least one tire 304 is in a low pressure state in which the tire pressure is lower than the reference value, a controller in the implement 300B causes at least one of the implement 300B and the tractor 100A to perform a necessary operation. The tractor 100B in the present preferred embodiment may include crawlers, rather than tires 104.

Figure 23:
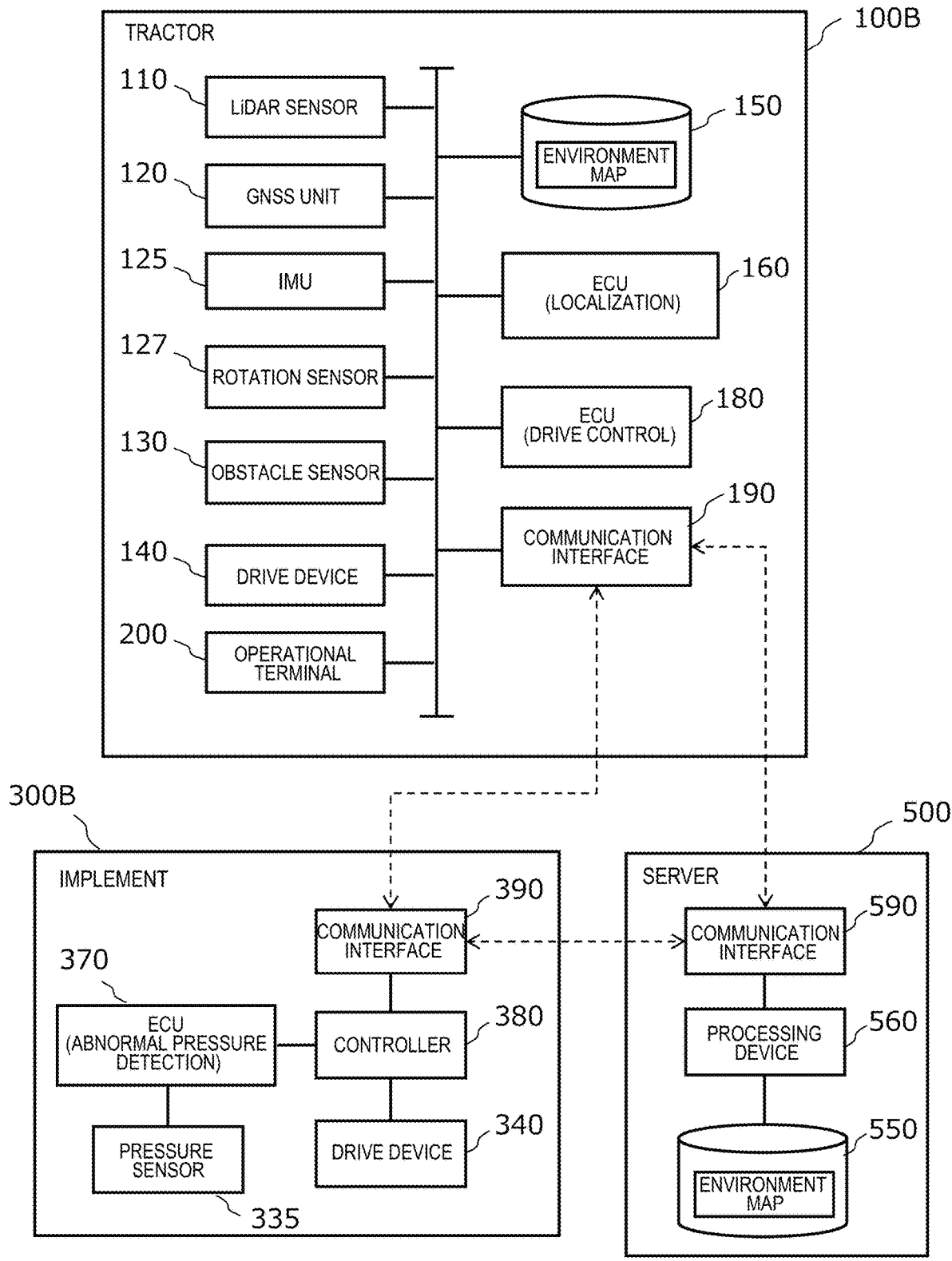
FIG. 23 is a block diagram showing an example of a schematic configuration of a tractor, an implement, and a server according to the second preferred embodiment of the present disclosure.

FIG. 23 is a block diagram showing an example of a schematic configuration of the tractor 100B, the implement 300B, and the server 500 in the present preferred embodiment. Unlike in the configuration of Preferred Embodiment 1 shown in FIG. 6, the tractor 100B does not include a pressure sensor 135 or an ECU 170. On the other hand, the implement 300B may include a pressure sensor 335 to measure the tire pressure of each tire 304, and an ECU 370 to detect that the tire pressure of each tire 304 is in a low pressure state in which the pressure is lower than a reference range or a high pressure state in which the pressure is higher than the reference range. The function of the pressure sensor 335 is similar to the function of the pressure sensor 135 of the tractor 100A in Preferred Embodiment 1. The function of the ECU 370 is similar to the function of the ECU 170 of the tractor 100A in Preferred Embodiment 1. Based on the tire pressure of a tire 304 as measured by the pressure sensor 335, the ECU 370 determines whether the tire 304 is in a low pressure state or not. When the measured pressure is lower than the reference range, the ECU 370 outputs a signal indicating that the tire 304 is in a low pressure state. When the measured pressure is in a higher than the reference range, the ECU 370 outputs a signal indicating that the tire 304 is in a high pressure state. When it is detected that at least one tire 304 is in a low pressure state or a high pressure state, the controller 380 may stop the operation of the implement 300B, transmit a signal to the tractor 100B to request a specific operation, or transmit a signal to the server 500 indicating the low pressure state. The signal to be transmitted to the tractor 100B may be a signal requesting that the linkage device 108 be driven so as to change the attitude of the implement 300B, or a signal requesting that supply of motive power to the implement 300B be stopped, for example. Instead of the implement 300B transmitting a signal indicating a low pressure state to the server 500, the tractor 100B may be instructed to transmit such a signal to the server 500. In response to the instruction, the tractor 100B may transmit positional information of the tractor 100B at that moment to the server 500.

Instead of using the pressure sensor 335, the implement 300B may detect that the tire 304 is in a low pressure state on the basis of temporal change in the positional information of the tractor 100B acquired from the tractor 100B. For example, the tire 304 being in a low pressure state may be detected based on a difference between a LiDAR vehicle velocity calculated from temporal change of the position of the tractor 100B as acquired through positioning using the LiDAR sensor 110, and a theoretical vehicle velocity that is calculated from the rotational speed of a tire 304 of the implement 300B and the circumference of the tire 304 in a normal state. Alternatively, the tire 304 being in a low pressure state may be detected based on a difference between a GNSS vehicle velocity that is calculated from temporal change of the position of the tractor 100B as acquired through positioning using the GNSS unit 120, and the theoretical vehicle velocity. In the case where the pressure of a tire 304 is estimated by such a method, the implement 300B may include a rotation sensor to measure the rotational speed of the tire 304. The implement 300B may include a LiDAR sensor or a GNSS unit. In that case, without obtaining positional information from the tractor 100B, the implement 300B itself may perform localization or positioning and perform the aforementioned operation.

The operation according to the present preferred embodiment is identical to Preferred Embodiment 1 except that it is not the tractor 100B but the implement 300B that detects an abnormal pressure of a tire 304 and performs a necessary operation. In the present preferred embodiment, too, various controls described with respect to Preferred Embodiment 1 are applicable.

Other Preferred Embodiments

The operation by the tractor 100A according to Preferred Embodiment 1 and the operation by the implement 300B according to Preferred Embodiment 2 may be combined. In other words, both of the tractor and the implement may measure or estimate the pressure of one or more tires that they include, and based on the measured or estimated value, control the operation of at least one of the tractor and the implement.

Figure 24:
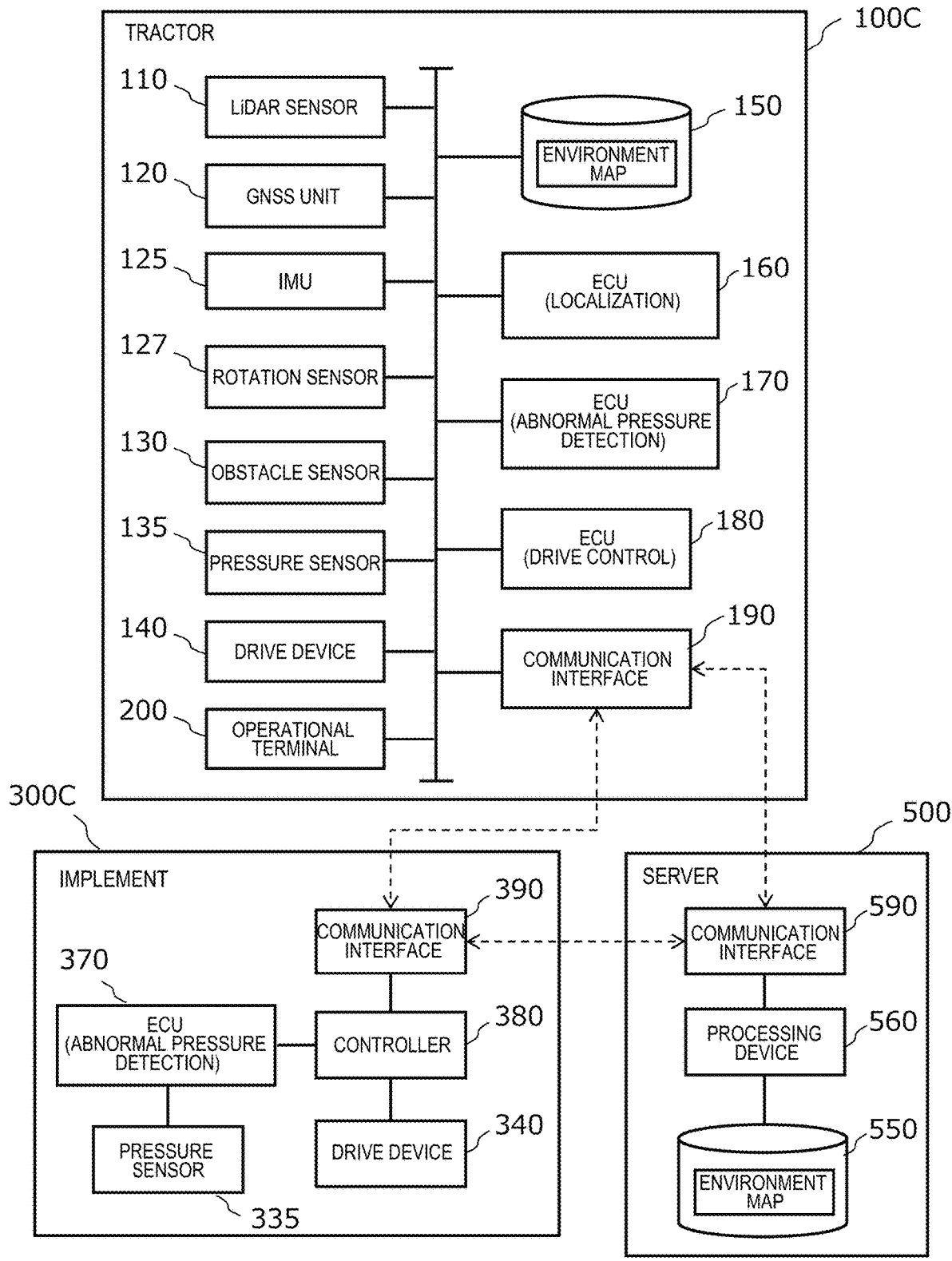
FIG. 24 is a block diagram schematically showing another example of a configuration of a tractor, an implement, and a server.

FIG. 24 is a block diagram schematically the configuration of a tractor 100C, an implement 300C, and a server 500 in one such preferred embodiment. In the example shown in FIG. 24, the tractor 100C is similar in configuration to the tractor 100A of Preferred Embodiment 1, whereas the implement 300C is similar in configuration to the implement 300B of Preferred Embodiment 2. The tractor 100C and the implement 300C are capable of bidirectional communications. Each of the tractor 100C and the implement 300C is also capable of communicating with the server 500. Each of the tractor 100C and the implement 300C includes one or more tires.

The tractor 100C performs a similar operation to that of the tractor 100A of Preferred Embodiment 1. For example, upon detecting that at least one of its tires is in a low pressure state or a high pressure state, the tractor 100C performs at least one operation of: halting or decelerating the tractor 100C; halting the implement 300C; adjustment of the position and/or attitude of the implement 300C; and signal transmission to the server 500.

The implement 300C performs a similar operation to that of the tractor 100B of Preferred Embodiment 2. For example, upon detecting that at least one of its tires is in a low pressure state or a high pressure state, the implement 300C performs at least one operation of halting or decelerating the tractor 100C, halting the implement 300C, adjustment of the position and/or attitude of the implement 300C, and signal transmission to the server 500.

With such a configuration, when a problem occurs in a tire of either the tractor or the implement, it is possible to timely detect the problem and take necessary measures. In the present preferred embodiment, too, various controls described with respect to Preferred Embodiment 1 are applicable.

In the preferred embodiment shown in FIG. 23 and FIG. 24, the pressure sensor 335 of the implement may have a wireless communication function. A numerical value indicating the tire pressure of a tire 304 as measured by the pressure sensor 335 may be received by the ECU 170 of the tractor, and the ECU 170 may determine whether the tire 304 is in a low pressure state or a high pressure state or not. In that case, the control to be performed upon detecting a low pressure state or a high pressure state is performed by the tractor. In such a preferred embodiment, the implement may not include the ECU 370.

In the above preferred embodiments, the position and/or attitude of the implement is changed by the tractor driving the linkage device 108. Without being limited to such an operation, for example, the implement may move or transform a specific portion of itself to attain a similar effect. For example, the sprayer itself may change the position and/or attitude of the nozzle of the sprayer to avoid contact with the crop.

A portion or an entirety of the processes to be performed by the ECU 170 and the ECU 180 of the tractor as well as the ECU 370 and the controller 380 of the implement may be performed by an external computer (e.g., the processing device 560 of the server 500). In such a configuration, from the tractor or the implement, measured values or estimated values of the pressure of its tire(s) are continuously transmitted to the computer. Based on the continuously-transmitted measured values or estimated values of pressure, the computer may detect an abnormal pressure of the tire(s), and send a command to the tractor or the implement to perform a necessary operation.

The tractor in each of the above preferred embodiments may be an unmanned tractor. In that case, component elements which are needed only for human driving, e.g., the cabin, the driver's seat, the steering wheel, and the operational terminal, may not be provided in the tractor. The unmanned tractor performs a similar operation to the operation in each of the above-described preferred embodiments through autonomous driving, or remote control by the user of the tractor.

In the above preferred embodiments, the LiDAR sensor provided in the tractor performs laser beam scanning in order to output two-dimensional or three-dimensional group-of-points data, or distance distribution data, as the sensor data. However, the LiDAR sensor is not limited to such a scan-type sensor. For example, a flash-type LiDAR sensor may be used. Alternatively, other types of sensors, e.g., an image sensor, may be used. Such other types of sensors may be combined with a LiDAR sensor. In the case where the tractor is to be used only in an environment where GNSS signals can be received, the tractor may not include a LiDAR sensor.

The work vehicle and the implement can be used not only in orchards (e.g., vineyards) but also in any other field. In the case where the tractor or the implement includes a LiDAR sensor and performs localization based on SLAM, an environment map within the field is to be generated in advance. The above-described preferred embodiments illustrate that the environment map is generated by the server 500. Alternatively, a map generating device (e.g., the ECU 160) provided in the tractor may generate the environment map. The map generating device can generate an environment map by merging the sensor data that is acquired by using the LiDAR sensor during travel in the field.

Thus, the present disclosure encompasses agricultural machines according to any of the following Items.

Item 1

An agricultural machine including one or more tires, a detector to detect a low pressure state in which a tire pressure of the one or more tires is lower than a reference range or a high pressure state in which the tire pressure is higher than the reference range, and a controller configured or programmed to control an operation of at least one of the agricultural machine and an additional agricultural machine to be linked to the agricultural machine, wherein one of the agricultural machine and the additional agricultural machine is a work vehicle that is capable of self-driving, and the other of the agricultural machine and the additional agricultural machine is an implement to be linked to the work vehicle in use, and the controller is configured or programmed to cause, in response to detection of the low pressure state or the high pressure state, at least one of the agricultural machine and the additional agricultural machine to perform a specific operation that is different from an operation to be performed when the tire pressure is in the reference range.

Item 2

The agricultural machine of Item 1, wherein the controller is configured or programmed to cause, in response to the detection of the low pressure state or the high pressure state during self-driving of the work vehicle, the at least one of the agricultural machine and the additional agricultural machine to perform the specific operation.

Item 3

The agricultural machine of Item 1, wherein the work vehicle is capable of autonomous driving, and the controller is configured or programmed to cause, in response to the detection of the low pressure state or the high pressure state during autonomous driving of the work vehicle, the at least one of the agricultural machine and the additional agricultural machine to perform the specific operation.

Item 4

The agricultural machine of any of Items 1 to 3, wherein the controller is configured or programmed to transmit, in response to the detection of the low pressure state or the high pressure state, to an external device a signal indicating that the low pressure state or the high pressure state has emerged.

Item 5

The agricultural machine of Item 4, further including a localization estimator to estimate a position of the agricultural machine during travel, wherein the controller is configured or programmed to transmit, in response to the detection of the low pressure state or the high pressure state, the signal and information indicating the position of the agricultural machine to the external device.

Item 6

The agricultural machine of any of Items 1 to 5, wherein the agricultural machine is the work vehicle and the additional agricultural machine is the implement.

Item 7

The agricultural machine of Item 6, wherein the controller is configured or programmed to perform, in response to the detection of the low pressure state or the high pressure state during self-driving of the work vehicle, at least one of an operation of halting or decelerating the work vehicle, an operation of adjusting the position and/or attitude of the implement, and an operation of halting or decelerating the implement.

Item 8

The agricultural machine of Item 7, further including a linkage to link the agricultural machine and the implement together, wherein the controller is configured or programmed to change, in response to the detection of the low pressure state or the high pressure state during self-driving of the work vehicle, a position and/or an attitude of the implement by raising or lowering the linkage.

Item 9

The agricultural machine of any of Items 6 to 8, wherein, the implement is a sprayer to spray a chemical agent over a crop, and the controller is configured or programmed to change, in response to the detection of the low pressure state or the high pressure state during self-driving of the work vehicle, a position and/or an attitude of the sprayer to prevent the sprayer from coming into contact with the crop.

Item 10

The agricultural machine of any of Items 6 to 9, wherein the controller is configured or programmed to change, in response to the detection of the low pressure state or the high pressure state, a value of a control gain to determine a steering angle in automatic steering from a value of the case where the tire pressure of the one or more tires is within the reference range.

Item 11

The agricultural machine of any of Items 6 to 10, wherein the work vehicle is a four-wheel drive vehicle that includes a differential including a locking differential and the controller is configured or programmed to change, in response to the detection of the low pressure state or the high pressure state, a timing of switching from two-wheel drive to four-wheel drive, and/or a timing of enabling the locking differential, from a timing of the case where the tire pressure of the one or more tires is within the reference range.

Item 12

The agricultural machine of any of Items 1 to 5, wherein the additional agricultural machine is the work vehicle, and the agricultural machine is the implement.

Item 13

The agricultural machine of Item 12, wherein the controller is configured or programmed to perform, in response to the detection of the low pressure state or the high pressure state during self-driving of the work vehicle, at least one of an operation of halting or decelerating the work vehicle, an operation of causing the work vehicle to adjust the position and/or attitude of the implement, and an operation of halting or decelerating the implement.

Item 14

The agricultural machine of Item 12, wherein the work vehicle includes a linkage to link the work vehicle and the implement together and the controller is configured or programmed to causes, in response to the detection of the low pressure state or the high pressure state during self-driving of the work vehicle, the work vehicle to change a position and/or an attitude of the implement by raising or lowering the linkage device.

Item 15

The agricultural machine of any of Items 12 to 14, wherein the implement is a sprayer to spray a chemical agent over a crop, and the controller is configured or programmed to cause, in response to the detection of the low pressure state or the high pressure state during self-driving of the work vehicle, the work vehicle to change a position and/or an attitude of the sprayer to prevent the sprayer from coming into contact with the crop.

Item 16

The agricultural machine of any of Items 1 to 15, further including a pressure sensor to measure the tire pressure of the one or more tires, wherein the detector is operable to detect the low pressure state or the high pressure state based on the measured tire pressure.

Item 17

The agricultural machine of any of Items 1 to 15, further including a GNSS receiver to receive a GNSS signal, and a rotation sensor to measure a rotational speed of the one or more tires, wherein the detector is operable to detect the low pressure state or the high pressure state based on a difference between a velocity of the agricultural machine as estimated based on the rotational speed measured by the rotation sensor and a velocity of the agricultural machine as estimated based on data acquired by the GNSS receiver.

Item 18

The agricultural machine of any of Items 1 to 15, further including a LiDAR sensor to output sensor data indicating a distribution of objects in a surrounding environment of the agricultural machine, and a rotation sensor to measure a rotational speed of the one or more tires, wherein the detector is operable to detect the low pressure state or the high pressure state based on a difference between a velocity of the agricultural machine as estimated based on the rotational speed measured by the rotation sensor and a velocity of the agricultural machine as estimated based on the sensor data.

Item 19

The agricultural machine of any of Items 1 to 18, wherein the detector is operable to detect a state where at least one of the tires has a puncture as the low pressure state.

Item 20

The agricultural machine of any of Items 1 to 18, wherein the detector is operable to detect a first low pressure state in which the tire pressure of the one or more tires is lower than a first reference value, the first reference value being a lower limit value of the reference range, and a second low pressure state in which the tire pressure of the one or more tires is lower than a second reference value, the second reference value being smaller than the first reference value, and the controller is configured or programmed to cause, in response to detection of the first low pressure state, at least one of the agricultural machine and the additional agricultural machine to perform a first operation as the specific operation, and cause, in response to detection of the second low pressure state, at least one of the agricultural machine and the additional agricultural machine to perform a second operation which is different from the first operation.

Item 21

A control system for controlling a work vehicle that is capable of self-driving or an implement to be linked to the work vehicle in use, the control system including a detector to detect a low pressure state in which a tire pressure of one or more tires of the work vehicle or the implement is lower than a reference range or a high pressure state in which the tire pressure is higher than the reference range, and a controller configured or programmed to cause, in response to detection of the low pressure state or the high pressure state, at least one of the work vehicle and the implement to perform a specific operation that is different from an operation to be performed when the tire pressure is in the reference range.

Item 22

A method of controlling a work vehicle that is capable of self-driving or an implement to be linked to the work vehicle in use, the method including detecting a low pressure state in which a tire pressure of one or more tires of the work vehicle or the implement is lower than a reference range or a high pressure state in which the tire pressure is higher than the reference range, and causing, in response to detection of the low pressure state or the high pressure state, at least one of the work vehicle and the implement to perform a specific operation that is different from an operation to be performed when the tire pressure is in the reference range.

Item 23

A computer program, stored on a non-transitory computer readable storage medium, to be executed by a computer configured to control a work vehicle that is capable of self-driving or an implement to be linked to the work vehicle in use, the computer program being configured to cause the computer to perform detecting a low pressure state in which a tire pressure of one ore more tires of the work vehicle or the implement is lower than a reference range or a high pressure state in which the tire pressure is higher than the reference range, and causing, in response to detection of the low pressure state or the high pressure state, at least one of the work vehicle and the implement to perform a specific operation that is different from an operation to be performed when the tire pressure is in the reference range.

The techniques according to various example preferred embodiments of the present disclosure are applicable to work vehicles such as tractors, and any implement to be linked to the work vehicle in use (e.g., a sprayer, a mower, a seeder, a spreader, or a harvester), for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
one or more tires;
a detector to detect a low pressure state in which a tire pressure of the one or more tires is lower than a reference range or a high pressure state in which the tire pressure is higher than the reference range; and
a controller configured or programmed to control an operation of at least one of the agricultural machine and an additional agricultural machine to be linked to the agricultural machine; wherein
one of the agricultural machine and the additional agricultural machine is a work vehicle that is capable of self-driving, and the other of the agricultural machine and the additional agricultural machine is an implement to be linked to the work vehicle in use;
the controller is configured or programmed to cause, in response to detection of the low pressure state or the high pressure state, at least one of the agricultural machine and the additional agricultural machine to perform a specific operation that is different from an operation to be performed when the tire pressure is in the reference range;
the implement includes a sprayer to spray a chemical agent over a crop; and
the controller is configured or programmed to change, in response to the detection of the low pressure state or the high pressure state during self-driving of the work vehicle, a position and/or an attitude of the sprayer to prevent the sprayer from coming into contact with the crop.

2. The agricultural machine of claim 1, wherein, the controller is configured or programmed to cause, in response to the detection of the low pressure state or the high pressure state during self-driving of the work vehicle, the at least one of the agricultural machine and the additional agricultural machine to perform the specific operation.

3. The agricultural machine of claim 1, wherein
the agricultural machine is the work vehicle; and
the additional agricultural machine is the implement.

4. The agricultural machine of claim 3, wherein the controller is configured or programmed to perform, in response to the detection of the low pressure state or the high pressure state during self-driving of the work vehicle, at least one of:
an operation of halting or decelerating the work vehicle;
an operation of adjusting a position and/or an attitude of the implement; and
an operation of halting or decelerating the implement.

5. The agricultural machine of claim 4, further comprising a linkage to link the agricultural machine and the implement together; wherein
the controller is configured or programmed to change, in response to the detection of the low pressure state or the high pressure state during self-driving of the work vehicle, a position and/or an attitude of the implement by raising or lowering the linkage.

6. The agricultural machine of claim 3, wherein the controller is configured or programmed to change, in response to the detection of the low pressure state or the high pressure state, a value of a control gain to determine a steering angle in automatic steering from a value of the case where the tire pressure of the one or more tires is within the reference range.

7. The agricultural machine of claim 3, wherein
the work vehicle is a four-wheel drive vehicle that includes a differential including a locking differential; and
the controller is configured or programmed to change, in response to the detection of the low pressure state or the high pressure state, the timing of switching from two-wheel drive to four-wheel drive, and/or a timing of enabling the locking differential, from a timing of the case where the tire pressure of the one or more tires is within the reference range.

8. The agricultural machine of claim 1, wherein
the additional agricultural machine is the work vehicle; and
the agricultural machine is the implement.

9. The agricultural machine of claim 8, wherein the controller is configured or programmed to perform, in response to the detection of the low pressure state or the high pressure state during self-driving of the work vehicle, at least one of:
an operation of halting or decelerating the work vehicle;
an operation of causing the work vehicle to adjust a position and/or an attitude of the implement; and
an operation of halting or decelerating the implement.

10. The agricultural machine of claim 8, wherein
the work vehicle includes a linkage to link the work vehicle and the implement together; and,
the controller is configured or programmed to cause, in response to the detection of the low pressure state or the high pressure state during self-driving of the work vehicle, the work vehicle to change a position and/or an attitude of the implement by raising or lowering the linkage.

11. The agricultural machine of claim 1, further comprising a pressure sensor to measure the tire pressure of the one or more tires; wherein
the detector is operable to detect the low pressure state or the high pressure state based on the measured tire pressure.

12. The agricultural machine of claim 1, further comprising:
a GNSS receiver to receive a GNSS signal; and
a rotation sensor to measure a rotational speed of the one or more tires; wherein
the detector is operable to detect the low pressure state or the high pressure state based on a difference between a velocity of the agricultural machine as estimated based on the rotational speed measured by the rotation sensor and a velocity of the agricultural machine as estimated based on data acquired by the GNSS receiver.

13. The agricultural machine of claim 1, further comprising:
a LiDAR sensor to output sensor data indicating a distribution of objects in a surrounding environment of the agricultural machine; and
a rotation sensor to measure a rotational speed of the one or more tires; wherein
the detector is operable to detect the low pressure state or the high pressure state based on a difference between a velocity of the agricultural machine as estimated based on the rotational speed measured by the rotation sensor and a velocity of the agricultural machine as estimated based on the sensor data.

14. The agricultural machine of claim 1, wherein
the detector is operable to detect a first low pressure state in which the tire pressure of the one or more tires is lower than a first reference value, the first reference value being a lower limit value of the reference range, and a second low pressure state in which the tire pressure of the one or more tires is lower than a second reference value, the second reference value being smaller than the first reference value; and
the controller is configured or programmed to:
cause, in response to detection of the first low pressure state, at least one of the agricultural machine and the additional agricultural machine to perform a first operation as the specific operation; and
cause, in response to detection of the second low pressure state, at least one of the agricultural machine and the additional agricultural machine to perform a second operation which is different from the first operation.

15. A control system for controlling an operation of at least one of a first agricultural machine and a second agricultural machine to be linked to the first agricultural machine, one of the first and second agricultural machines being a work vehicle that is capable of self-driving, and the other of the first and second agricultural machines being an implement to be linked to the work vehicle in use, the control system comprising:
a detector to detect a low pressure state in which a tire pressure of one or more tires of the first agricultural machine is lower than a reference range or a high pressure state in which the tire pressure is higher than the reference range; and
a controller configured or programmed to cause, in response to detection of the low pressure state or the high pressure state, at least one of the first and second agricultural machines to perform a specific operation that is different from an operation to be performed when the tire pressure is in the reference range; wherein
the implement includes a sprayer to spray a chemical agent over a crop; and
the specific operation includes changing, in response to the detection of the low pressure state or the high pressure state during self-driving of the work vehicle, a position and/or an attitude of the sprayer to prevent the sprayer from coming into contact with the crop.

16. A method of controlling an operation of at least one of a first agricultural machine and a second agricultural machine to be linked to the first agricultural machine, one of the first and second agricultural machines being a work vehicle that is capable of self-driving, and the other of the first and second agricultural machines being an implement to be linked to the work vehicle in use, the method comprising:
detecting a low pressure state in which a tire pressure of one or more tires of the first agricultural machine is lower than a reference range or a high pressure state in which the tire pressure is higher than the reference range; and
causing, in response to detection of the low pressure state or the high pressure state, at least one of the first and second agricultural machines to perform a specific operation that is different from an operation to be performed when the tire pressure is in the reference range; wherein
the implement includes a sprayer to spray a chemical agent over a crop; and
the specific operation includes changing, in response to the detection of the low pressure state or the high pressure state during self-driving of the work vehicle, a position and/or an attitude of the sprayer to prevent the sprayer from coming into contact with the crop.

17. The agricultural machine of claim 1, wherein the controller is configured or programmed to transmit, in response to the low pressure state or the high pressure state, to an external device a signal indicating that the low pressure state or the high pressure state has emerged.

18. The agricultural machine of claim 17, further comprising a localization estimator to estimate a position of the agricultural machine during travel; wherein
the controller is configured or programmed to transmit, in response to the detection of the low pressure state or the high pressure state, the signal and information indicating the position of the agricultural machine to the external device.

* * * * *